(12) United States Patent
Nimmagadda et al.

(10) Patent No.: US 11,530,921 B2
(45) Date of Patent: Dec. 20, 2022

(54) METHOD OF GENERATING A COLLISION FREE PATH OF TRAVEL AND COMPUTING SYSTEM

(71) Applicant: Intel Corporation, Santa Clara, CA (US)

(72) Inventors: Mallikarjuna Rao Nimmagadda, Bangalore (IN); Shreela Dattawadkar, Bengaluru (IN); Pranjali Deshmukh, Bangalore (IN); Sriram Kabisthalam Muthukumar, Coimbatore (IN); Akhila Madhu Kumar, Toronto (CA)

(73) Assignee: INTEL CORPORATION, Santa Clara, CA (US)

( * ) Notice: Subject to any disclaimer, the term of this patent is extended or adjusted under 35 U.S.C. 154(b) by 161 days.

(21) Appl. No.: 16/145,188

(22) Filed: Sep. 28, 2018

(65) Prior Publication Data

US 2019/0051198 A1 Feb. 14, 2019

(51) Int. Cl.
*G01C 21/20* (2006.01)
*G08G 9/02* (2006.01)
(Continued)

(52) U.S. Cl.
CPC .............. *G01C 21/20* (2013.01); *B64C 39/02* (2013.01); *B64C 39/024* (2013.01);
(Continued)

(58) Field of Classification Search
CPC ...... G08G 9/02; G08G 5/0069; G08G 5/0034; G08G 5/045; G08G 5/0021; G08G 5/006;
(Continued)

(56) References Cited

U.S. PATENT DOCUMENTS 6,700,574 B1 3/2004 Song
2008/0046173 A1* 2/2008 Lappe ................ G01C 21/3438
701/533

(Continued)

OTHER PUBLICATIONS

Seok, Joon-Hong; Oh, Changmok; Lee, Ju-Jang; and Lee, Ho Joo, Integrated Path Planning for a Partially Unknown Outdoor Environment, IEEE, SI International, 2011, p. 643-645 (Year: 2011).*

(Continued)

*Primary Examiner* — Aniss Chad
*Assistant Examiner* — Chase L Cooley
(74) *Attorney, Agent, or Firm* — Viering, Jentschura & Partner mbB

(57) ABSTRACT

According to various aspects, a method of generating a collision free path of travel may include defining a global search area encompassing at least a global start position and a global target position; and determining a set of collision free trajectories by iteration, the set of collision free trajectories connecting the global start position to the global target position via one or more local target positions, each iteration including: determining a local search area within the global search area; determining, from the global obstacle map, a local obstacle map associated with the local search area; defining a local start position and one or more local target positions within the local search area; and calculating, in the local search area, a collision free trajectory from the local start position to the one or more local target positions considering the local obstacle map.

20 Claims, 12 Drawing Sheets

(51) Int. Cl.
    G05D 1/00    (2006.01)
    G08G 5/00    (2006.01)
    B64C 39/02   (2006.01)
    G08G 5/04    (2006.01)
    G05D 1/10    (2006.01)

(52) U.S. Cl.
    CPC ......... G05D 1/0066 (2013.01); G05D 1/0088 (2013.01); G05D 1/106 (2019.05); G08G 5/006 (2013.01); G08G 5/0021 (2013.01); G08G 5/0034 (2013.01); G08G 5/0069 (2013.01); G08G 5/045 (2013.01); G08G 9/02 (2013.01)

(58) Field of Classification Search
    CPC .... B64C 39/02; B64C 39/024; G05D 1/0066; G05D 1/101; G05D 1/0088; G05D 1/10; G05D 1/0005; G05D 1/0217; G05D 1/0274; G01C 21/20
    See application file for complete search history.

(56) References Cited

U.S. PATENT DOCUMENTS

| | | | |
|---|---|---|---|
| 2016/0210863 A1* | 7/2016 | Kohn-Rich | G08G 5/0034 |
| 2019/0286766 A1* | 9/2019 | Yoshida | G08G 1/005 |
| 2019/0339703 A1* | 11/2019 | Bao | G05D 1/0221 |

OTHER PUBLICATIONS

Shahed, Shojaeipour; Sallehuddin, Mohamed Haris; and Ali, Shojaeipour, Implementation Roadmap using Voronoi Diagrams for Vision-based Robot Motion, WSEAS Transactions on Systems, Issue 6, vol. 9, 2010, p. 643 and 646 (Year: 2010).*

Swingler, Ashley; A Cell Decomposition Approach to Robotic Trajectory Planning via Disjunctive Programming, 2012, Duke University, pp. 27-29 (Year: 2012).*

Maki K. Habib, Real Time Mapping and Dynamic Navigation for Mobile Robots, 2007, International Journal of Advanced Robotic Systems, vol. 4, No. 3 pp. 328 (Year: 2007).*

Yourdictionary.com, centroid, 2017, yourdictionary.com, pp. 1 (Year: 2017).*

Seok et. al; "Integrated path planning for a partially unknown outdoor enviroment"; Dec. 20, 2011; pp. 643-648; IEEE/SICE International Symposium on System Integration (SII); Kyoto, Japan.

European search report issued for the corresponding EP application No. 19183077.7, dated Jan. 23, 2020, 8 pages (for informational purposes only).

Blanco et al.; TP-Space RRT—Kinematic Path Planning of Non-Holonomic Any-Shape Vehicles; International Journal of Advanced Robotic Systems; Feb. 20, 2015; pp. 1-9.

Blanco et al.; Extending Obstacle Avoidance Methods through Multiple Parameter-Space Transformations; Autonomous Robots; Jan. 2008; vol. 24; Issue 1.

Qureshi et al.; Triangular Geometry based Optimal Motion Planning using RRT-Motion Planner; ResearchGate; Mar. 2014; pp. 380-385.

Karaman et al.; Anytime Motion Planning using the RRT; IEEE International Conference on Robotics and Automation; May 2011; pp. 1478-1483.

Gammell et al.; Informed RRT: Optimal Sampling-based Path Planning Focused via Direct Sampling of an Admissible Ellipsoidal Heuristic; Nov. 2014.

Hart et al.; A Formal Basis for the Heuristic Determination of Minimum Cost Paths; IEEE Transactions of Systems Science and Cybernetics; vol. SSC-4; No. 2; Jul. 1968; pp. 100-107.

European Office Action issued for the corresponding European Patent Application No. 19183077.7, dated Jun. 17, 2021, 5 pages (for informational purposes only).

* cited by examiner

FIG. 10A
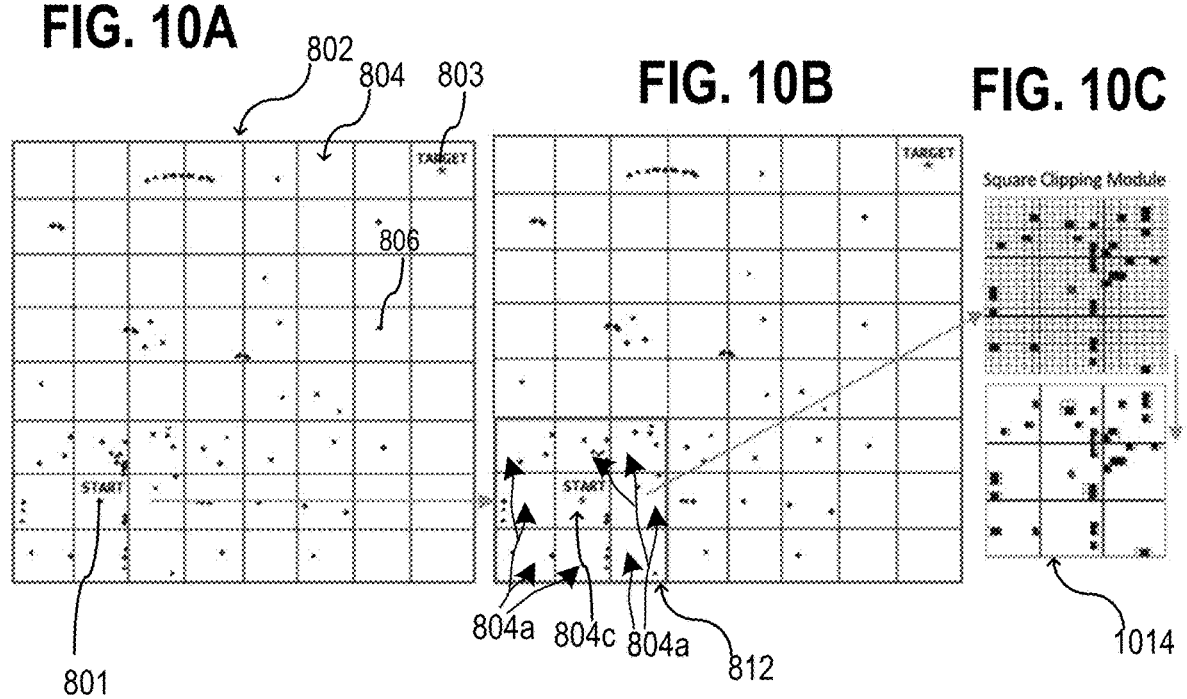
FIG. 10B  FIG. 10C
FIG. 11A
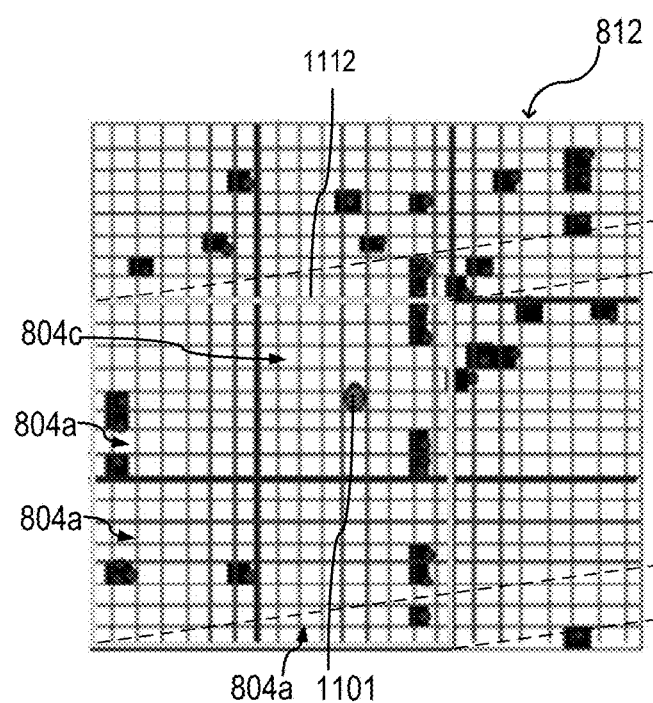
FIG. 11B
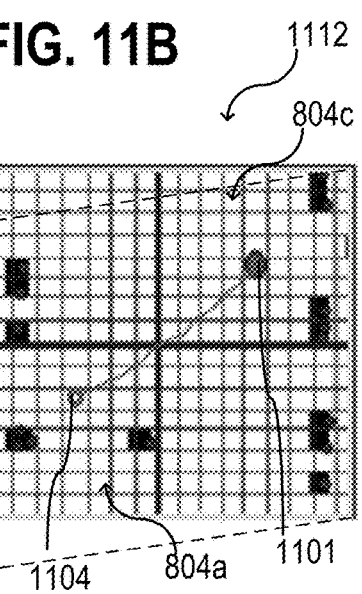

METHOD OF GENERATING A COLLISION FREE PATH OF TRAVEL AND COMPUTING SYSTEM

TECHNICAL FIELD

Various aspects relate generally to a method of generating a collision free path of travel and a computing system. The computing system may be part of any type of partially or fully autonomously traveling vehicle, as, for example, an unmanned aerial vehicle, a ground robot, an unmanned water vessel, an unmanned spacecraft, etc.

BACKGROUND

A partially or fully autonomously traveling vehicle may have an on-board computing system to control travel (e.g. any type of locomotion) of the vehicle along a predefined path of travel. The computing system may include one or more processors, one or more memories, or any other suitable components to control locomotion of the vehicle. The locomotion of the vehicle may be controlled by instructing one or more motor controllers, as an example. The predefined path of travel for the vehicle may be provided and/or modified, for example, by manual remote control, waypoint control, target tracking, etc. Further, an obstacle detection and avoidance system may be implemented into the partially or fully autonomously traveling vehicle to avoid collision of the vehicle with one or more obstacles may be located in a vicinity of the vehicle. As an example, a vehicle with obstacle detection may be configured to detect obstacles, e.g. solid objects, and provide obstacle information to the computing system of the vehicle and the computing system may be configured to adapt the predefined path of travel to avoid collision with the detected obstacles. The obstacle information may include, for example, at least position information related to the respective one or more obstacles. As an example, the obstacle information may be used to generate an obstacle map that can be utilized to avoid collision with the respective obstacles. In general, the dimension considered for obstacle detection and avoidance may be dependent from the type of vehicle and the typical way of locomotion of the vehicle. As an example, a ground robot may use, at least in some scenarios, a two-dimensional map (i.e. a two-dimensional coordinate system) for navigating and an aerial vehicle may use, at least in some scenarios, a three-dimensional map (i.e. a three-dimensional coordinate system) for navigating.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 10A, FIG. 10B, and FIG. 10C show a generation of a local obstacle map from a global obstacle map in a schematic view, according to various aspects;

FIG. 11A and FIG. 11B show one or more functions of a grid module in a schematic view, according to various aspects;

DESCRIPTION

Figure 1:
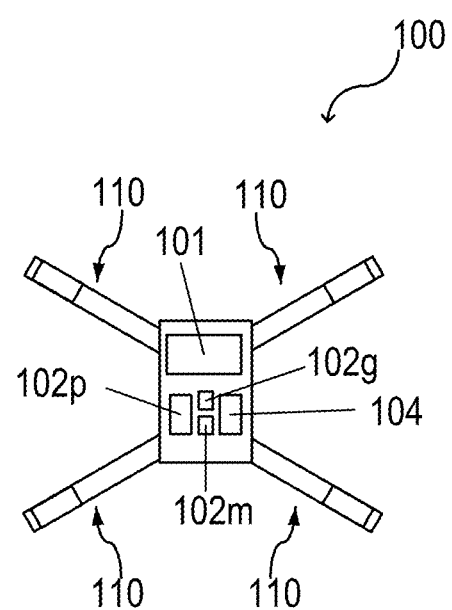
FIG. 1 shows a vehicle in a schematic view, according to various aspects.

The following detailed description refers to the accompanying drawings that show, by way of illustration, specific details and aspects in which the disclosure may be practiced.

One or more aspects are described in sufficient detail to enable those skilled in the art to practice the disclosure. Other aspects may be utilized and structural, logical, and/or electrical changes may be made without departing from the scope of the disclosure.

The various aspects of the disclosure are not necessarily mutually exclusive, as some aspects can be combined with one or more other aspects to form new aspects.

Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of),"

"grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, may be not limited to the aforementioned examples and may take various forms and represent any information as understood in the art.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, a cache memory, as examples. The term "memory" detailed herein may be understood to include any suitable type of cash memory, e.g. located on a chip, as an example.

In some aspects, a computing system may include one or more processors and one or more memories integrated on a single chip, also referred to system on a chip (SoC). In some aspects, a computing system may include one or more micro controllers, e.g. additionally to the one or more processors.

Differences between software and hardware implemented data handling may blur. A processor, controller, and/or circuit detailed herein may be implemented in software, hardware and/or as hybrid implementation including software and hardware.

The term "system" (e.g., a computing system) detailed herein may be understood as a set of interacting elements, wherein the elements can be, by way of example and not of limitation, one or more mechanical components, one or more electrical components, one or more instructions (e.g., encoded in storage media and/or in hardware), and/or one or more processors, as examples.

The term "position" used with regard to a "position of a vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "path" used with regard to a "path of travel", a "traveled path", a "path of movement", and the like, may be understood as a trajectory in a two- or three-dimensional space associated with a locomotion of a vehicle. The path of travel may include a series (e.g., a time-resolved series) of positions along which the vehicle has traveled and/or a series (e.g., a time-resolved series) of way points along which the vehicle shall travel, a respective current position, and/or at least one target position towards which the vehicle is traveling. The series of positions along which the vehicle has already traveled may define a traveled path. The current position and the at least one target position may define a remaining path of travel.

Various aspects are related to finding a path from a start position (e.g. a current position of the vehicle) to a desired target position. These positions are related to global positions, wherein the planned path of travel between these positions is generated based on various intermediated positions. The intermediate positions for finding the path of travel may be referred to as local positions, e.g. local start positions, local target positions, and/or current (local) search positions.

The term "map" used herein, for example, with regard to a two- or three-dimensional map may include any suitable way of describing positions of objects in the two- or three-dimensional space. According to various aspects, a two- or three-dimensional map may be used to describe objects (e.g. obstacles) in the respective space based on two- or three-dimensional computer images. The two- or three-dimensional map may include pixels or voxels associated with respective image positions. The two- or three-dimensional map may be a binary map, wherein each pixel or voxel has either a first state (e.g. a first color or any other first parameter) or a second state (e.g. a second color or any other second parameter) associated therewith. The first state may be associated with a free-space (e.g. a position or obstacle grid cell where no obstacle is located) and the second state may be associated with a blocked-space (e.g. a position or obstacle grid cell where one or more obstacles are located). Each pixel or voxel of a map may be associated (e.g. unambiguously) with a position or area in the real space. However, the path of travel of the vehicle may be independent of the map that is used for the search. In other words, the path of travel and the locomotion of the vehicle may not be bound to nodes and/or grid edges of the respective grid that is used for the path-planning. Illustratively, the vehicle may move freely along a path in space in accordance with its movement abilities. The vehicle may not move along predefined (e.g. static) paths of a grid. In some aspects, the path may be generated considering the locomotion of the vehicle and/or with enough buffer space to accommodate the locomotion of the vehicle.

A vehicle, as described herein, may have a capability of autonomous travel, e.g. the vehicle may be an unmanned aerial vehicle that has a capability of autonomous flight. In autonomous travel, a human pilot may be not in control of the vehicle. The vehicle may be unmanned, also denoted as unstaffed, uninhabited, or unpiloted. The vehicle may be any type of ground vehicle, a watercraft (also referred to as marine vessel, including, for example, a ship, a boat, a hovercraft, and/or a submarine), an aircraft, a spacecraft, or any other type of vehicle.

The vehicle, according to various aspects, may include one or more sensors, for example, to detect obstacles in its vicinity. In some aspects, a depth camera may be used for detecting and/or tracking one or more obstacles in a vicinity of the vehicle. The depth camera may be used to monitor the vicinity of the vehicle, provide images to a computing system associated with the vehicle, and/or to provide images to a user of the vehicle, as examples. A depth camera may allow associating depth information with an image, e.g., to provide a depth image. This allows, for example, providing an image of the vicinity of the vehicle including depth information about one or more objects depicted in the image. In some aspects, the vehicle may include one or more receivers and a computing system configured to receive an obstacle map. The data representing the obstacle map may be send by a control device associated with one or more vehicles. The obstacle map may represent one or more obstacles and their respective absolute positions and/or relative positions with respect to the vehicle.

As an example, a map construction may be achieved by using a map engine, which may include one or more processors or a non-transitory computer readable medium configured to create a pixel or voxel (e.g. obstacle) map (or any other suitable map) from obstacle position information.

According to various aspects, a vehicle may have a heading direction. The heading direction may be understood as a reference direction assigned with a straightforward direction of movement. Further, the vehicle may have a limited ability of movement, e.g. a minimum turning circle radius. In some aspects, the ability of movement (e.g. the possible movement directions, the velocity, the acceleration, etc.) of the vehicle may be considered for determining the trajectories for a planned path of travel.

The vehicle described herein may be in the shape of an airplane (e.g. a fixed wing airplane), a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle, as examples. An unmanned aerial vehicle may include a plurality of rotors (e.g., three, four, five, six, seven, eight, or more than eight rotors), also referred to as propellers. The vehicle described herein may be in the shape of a ground vehicle (e.g. a car, a ground robot, etc.). The ground vehicle may be unmanned. The ground vehicle may include one or more wheels (e.g., one, two, three, four, or more than four wheels). It is noted that the respective wheels of the vehicle and the driving system may be configured to allow various types of movement.

In general, a respective configuration of the propulsion system of a vehicle may define the movement abilities of the vehicle. As an example, the configuration of a steering of a ground vehicle may define, for example, a minimal turning cycle. As another example, an unmanned aerial vehicle (also referred to as drone or flying robot) may have a limited lateral acceleration capability (e.g. less than 10 m/s$^2$) and a limited acceleration capability for a vertical ascending (e.g. less than 10 m/s$^2$). This may define, for example, properties of a turning flight (i.e. a maneuver in which the vehicle makes a controlled change of direction), e.g. minimum turning radius. The actual limitations for the movement of the vehicle may be considered in the path-finding algorithm described herein. As an example, one or more parameters of a trajectory module may be set to generate one or more trajectories considering the one or more parameters, wherein the one or more parameters represent movement abilities and/or limitations of the vehicle.

The vehicle may be in general configured, according to various aspects, to operate with various degrees of autonomy: under remote control by a human operator, or fully or intermittently autonomously, by onboard computers. The vehicle may be configured to carry out one or more movement functions autonomously in a corresponding mode. The vehicle may be configured to travel autonomously based on a predefined path of travel (also referred to as planned path). The path of travel may be a fixed predefined path from a starting point or a current position of the vehicle to a target position, or, the path of travel may be variable, e.g., following a target that defines a target position. In some aspects, the vehicle may switch into a GPS-guided autonomous mode at predefined conditions. The vehicle may have one or more fail safe operations modes, e.g., returning to the starting point, stopping (e.g. landing) immediately, etc. In some aspects, the vehicle may be controlled manually, e.g., by a remote control, e.g. temporarily.

In general, there may be a risk that an unmanned vehicle (also referred to as drone or robot) may collide with one or more other objects (also referred to as obstacles). Therefore, an unmanned vehicle may include one or more aspects of collision detection and/or avoidance. According to various aspects, the collision avoidance function of a vehicle may be implemented at least partially (in some aspects completely) in a path-planning algorithm as described exemplarily herein. Based on information of the surrounding (also referred to as vicinity) of the vehicle, e.g., measured by one or more sensors and stored in a global obstacle map, the vehicle will perform a collision avoidance by planning a collision free path of travel considering all relevant obstacles.

In the following, a vehicle is described in more detail. The vehicle may include at least one computing system, e.g. at least one or more processors and one or more memories. The computing system may be configured to carry out a path-planning algorithm, as, for example, described herein. Alternatively, the path-planning algorithm may be carried out by an external computing system, wherein the external computing system and the vehicle are configured to communicate with one another. In this case, the external computing system may transmit data representing a planned path of travel to the vehicle or may transmit control instructions to the vehicle to cause the vehicle to move along a planned path of travel.

According to various aspects, the vehicle may receive (e.g., determine, sense, etc.) information about its vicinity in order to determine potentially colliding objects. In some aspects, the received information may be used to include the respective obstacles, e.g., at least the potentially colliding objects, in a map. Alternatively, the vehicle may receive the map from the external computing system. The map (also referred to herein as obstacle map) may represent the vicinity of the vehicle and the respective obstacles based on geometric data, point clouds, pixels, voxels, or other representations. In the following, various configurations of the vehicle and various functionalities may be described for a pixel based local map (also referred to as binary image). However, alternatively or additionally, other suitable representations may be used as well.

In the following, various configurations and/or functionalities of a computing system are described, according to various aspects. In one or more aspects, the computing system may be part of a vehicle and may include one or more processors configured to determine a collision free path of travel for the vehicle from a start positions, e.g. a current position of the vehicle, to a desired target position. A central aspect of the adaptive directional planner described herein may be to generate a path that may be used to control movement of a vehicle. Considering the locomotion of the vehicle the adaptive directional planner described herein may generate the path so that it will make the controller job easy to track. In some aspects, the adaptive directional planner described herein may generate the path and may update the path if it finds a new obstacles coming in on its way autonomously. As a result, at least one obstacle avoidance feature will be implemented in the vehicle. As an example, based on the new/dynamic obstacles, a new path will be planned. The space in which the vehicle may be operated includes, for example, ground-2D, ground-3D, water-2D, air-3D, and water-3D. As an example, a ground bot itself might have various kinds of locomotion-Ackermann drive/differential drive/and jump abilities that may require a 3D map.

FIG. 1 illustrates a vehicle 100 in a schematic view, according to various aspects. In one or more aspects, the vehicle 100 may be configured as described above. The vehicle 100 may include one or more vehicle drive arrangements 110. As an example, the vehicle 100 may be configured as an aerial vehicle, wherein each of the one or more vehicle drive arrangements 110 may include at least one drive motor and at least one propeller (not illustrated) coupled to the at least one drive motor. As another example, the vehicle 100 may be configured as a ground vehicle, wherein each of the one or more vehicle drive arrangements 110 may include at least one drive motor and at least one wheel (not illustrated) coupled to the at least one drive motor. However, the vehicle 100 may be any other type of vehicle, e.g. any other type of partially or completely autonomously traveling vehicle.

Further, the vehicle 100 may include one or more processors 102p, e.g. configured to plan a path of travel for the vehicle 100 while avoiding one or more obstacles, as described in more detail below. The vehicle 100 may further include a controller (e.g. implement via the one or more processors 102p or implemented as a separate controller independent form the one or more processors 102p) to control a locomotion of the vehicle 100 in accordance with the planned path of travel. The one or more processors 102p of the vehicle 100 may be configured, for example, to provide a collision free path of travel based at least on a current position of the vehicle 100 and a target position for the vehicle 100 (see FIG. 2). In some aspects, the one or more processors 102p may (directly or indirectly) control the at least one drive motor and/or a steering assembly of the vehicle 100 to cause the vehicle 100 to travel along the collision free path of travel provided via a path-planning algorithm. The one or more processors 102p may include or may implement any type of computing device suitable for implementing the desired functions of the vehicle 100, e.g. suitable for a determination of a collision free path of travel. The one or more processors 102p may be implemented by any kind of one or more logic circuits.

According to various aspects, the vehicle 100 may include one or more memories 102m. The one or more memories 102m may be implemented by any kind of one or more electronic storing entities, e.g. one or more volatile memories and/or one or more non-volatile memories. The one or more memories 102m may be used, e.g., in interaction with the one or more processors 102p, to generate a collision free path of travel.

Further, the vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the vehicle 100 may optionally include one or more sensors 101. The one or more sensors 101 may be configured to monitor a vicinity of the vehicle 100. The one or more sensors 101 may be configured to detect obstacles in the vicinity of the vehicle 100. According to various aspects, the one or more processors 102p may be further configured to modify a predefined flight path of the vehicle 100 based on detected obstacles to generate a collision free flight path to the target position avoiding obstacles in the vicinity of the vehicle 100. The one or more sensors 101 may include, for example, one or more cameras (e.g., a depth camera, a stereo camera, etc.), one or more ultrasonic sensors, one or more radar (radio detection and ranging) sensors, one or more lidar (light detection and ranging) sensors, etc. The one or more sensors 101 may include, for example, any other suitable sensor that allows a detection of an object and the corresponding position of the object. The vehicle 100 may further include a position detection system 102g. The position detection system 102g may be based, for example, on global positioning system (GPS) or any other available positioning system. Therefore, the one or more processors 102p may be further configured to modify a predefined path of travel based on data obtained from the position detection system 102g. The position detection system 102g may be used, for example, to provide position and/or movement data of the vehicle 100 itself (including a position, e.g., a direction, a speed, an acceleration, etc., of the vehicle 100). However, other sensors (e.g., image sensors, a magnetic senor, etc.) may be used to provide position and/or movement data of the vehicle 100. The position and/or movement data of both the vehicle 100 and of the one or more obstacles may be used to predict a collision scenario (e.g., to predict a possible physical contact of one or more obstacles with the vehicle 100).

According to various aspects, the one or more processors 102p may include or may be coupled with at least one transceiver configured to provide an uplink transmission and/or downlink reception of radio signals including data, e.g. video or image data, data representing an obstacle map, data representing a desired target positon, and/or any type of commands. The at least one transceiver may include a radio frequency (RF) transmitter and/or a radio frequency (RF) receiver.

The one or more processors 102p may optionally include an inertial measurement unit (IMU) and/or a compass unit. The inertial measurement unit may allow, for example, a calibration of the vehicle 100 regarding a predefined plane in a coordinate system, e.g., to determine the roll and pitch angle of the vehicle 100 with respect to the gravity vector (e.g. from planet earth). Thus, an orientation of the vehicle 100 in a coordinate system may be determined. The orientation of the vehicle 100 may be calibrated using the inertial measurement unit before the vehicle 100 is operated. However, any other suitable function for navigation of the vehicle 100, e.g., for determining a position, a velocity, a direction of movement, etc., may be implemented in the one or more processors 102p and/or in additional components coupled to the one or more processors 102p.

According to various aspects, the one or more processors 102p and the one or more memories 102m may be part of a computing system 200 and may be configured to implement an algorithm for generating a collision free path of travel along which the vehicle 100 may be navigated.

Figure 2:
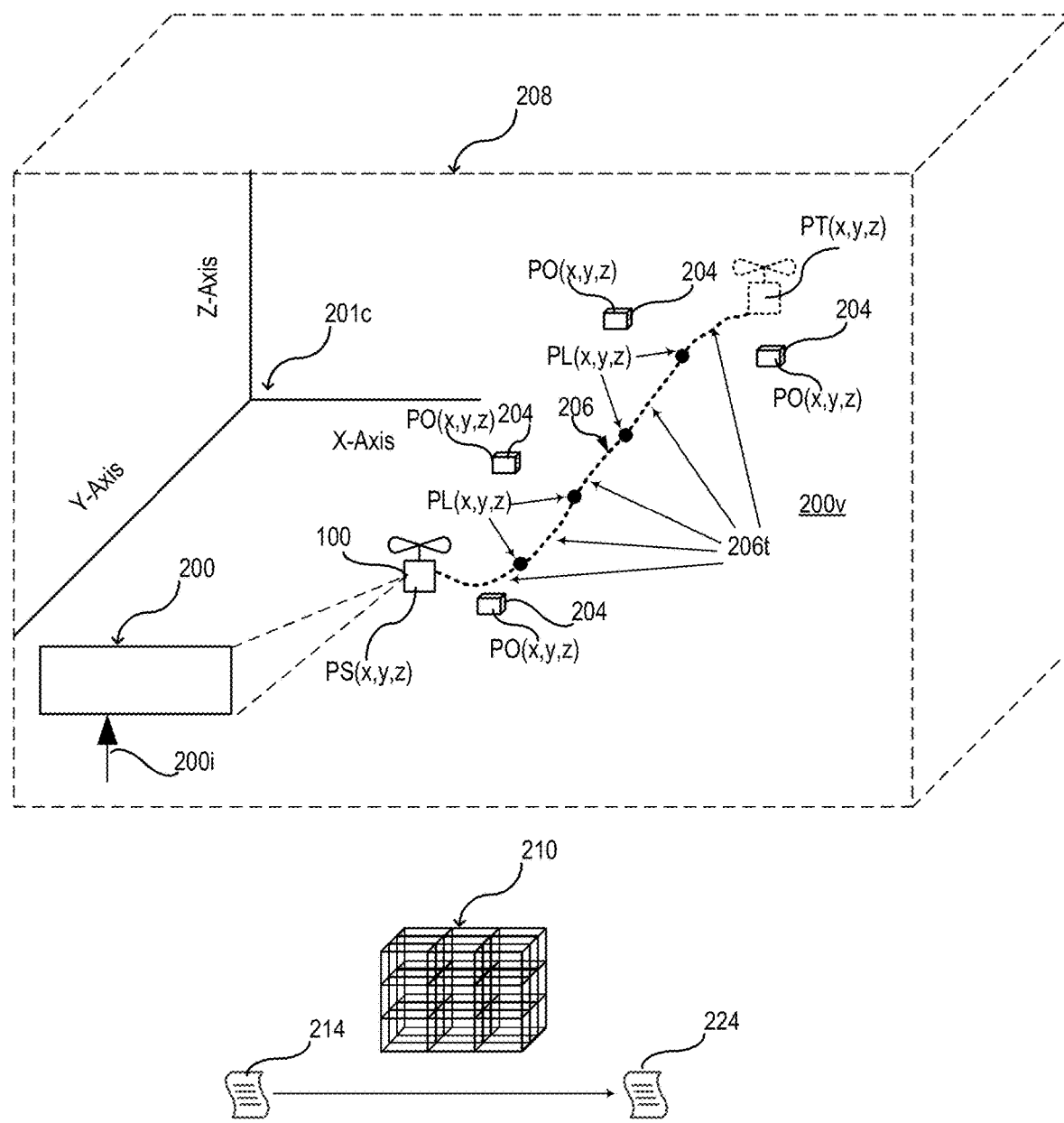
FIG. 2 shows a computing system in a schematic view, according to various aspects.

FIG. 2 shows a computing system 200 associated with the vehicle 100, according to various aspects, in a schematic view. The computing system 200 may be associated with a vehicle (e.g. with the vehicle 100 as described with reference to FIG. 1 or with any other suitable vehicle). For illustration, a coordinate system 201c is illustrated in FIG. 2 including an x-axis, a y-axis, and a z-axis in an orthogonal arrangement. The z-axis may represent a vertical direction;

the x-axis and the y-axis may represent horizontal directions perpendicular to the vertical direction.

According to various aspects, one or more obstacles 204 may be present in a vicinity 200v of the vehicle 100. Each of the one or more obstacles 204 may have a corresponding obstacle position $P_O(x,y,z)$ associated therewith. The obstacle positions may be determined by any type of the one or more sensors, e.g. for various times (also referred to as time-resolved) and may be represented via a global obstacle map 214.

According to various aspects, a start position $P_S(x,y,z)$ (also referred to as global start position) and a target position $P_T(x,y,z)$ (also referred to as global target position) for path-planning may be associated with the vehicle 100. The start position $P_S(x,y,z)$ may be a current position of the vehicle 100 that may be, for example, assumed being constant during planning a collision free path of travel 206 for the vehicle 100 from the start position $P_S(x,y,z)$ to the target position $P_T(x,y,z)$.

According to various aspects, the computing system 200 associated with the vehicle 100 may include one or more processors configured to generate the collision free path of travel 206 for the vehicle 100 from a global start position $P_S(x,y,z)$ to a global target position $P_T(x,y,z)$ based on input data 200i. The input data 200i may include position data representing the global start position $P_S(x,y,z)$, target position data representing the global target position $P_T(x,y,z)$, and obstacle data representing the global obstacle map 214.

According to various aspects, the generation of the collision free path of travel 206 may include defining a global search area 208 encompassing at least the global start position and the global target position and determining, by iteration, collision free trajectories 206t. A set of determined (e.g. optimal) collision free trajectories 206t may be selected, the set of determined collision free trajectories 206t connecting the global start position $P_S(x,y,z)$ to the global target position $P_T(x,y,z)$ via one or more local target positions $P_L(x,y,z)$, and, illustratively, provide the collision free path of travel 206 from the global start position $P_S(x,y,z)$ to the global target position $P_T(x,y,z)$. Additionally to a position, one or more additional parameters may be considered for determination of the path, as an example, the attitude (phi), e.g. the heading direction, may be considered within the algorithm described herein.

According to various aspects, each iteration may include, for example, determining a local search area 210 within the global search area 208; determining, from the global obstacle map 214, a local obstacle map 224 associated with the local search area 210; defining a local start position and one or more local target positions within the local search area 210; and determining (e.g. based on a calculation), in the local search area 210, (if possible) the respective one of the one or more collision free trajectories 206t from the local start position to the one or more local target positions $P_L(x,y,z)$ considering the local obstacle map 224. The one or more collision free trajectories 206t may not necessarily extend along predefined grid lines of a search grid that may be used to generate the local search area 210.

Figure 3:
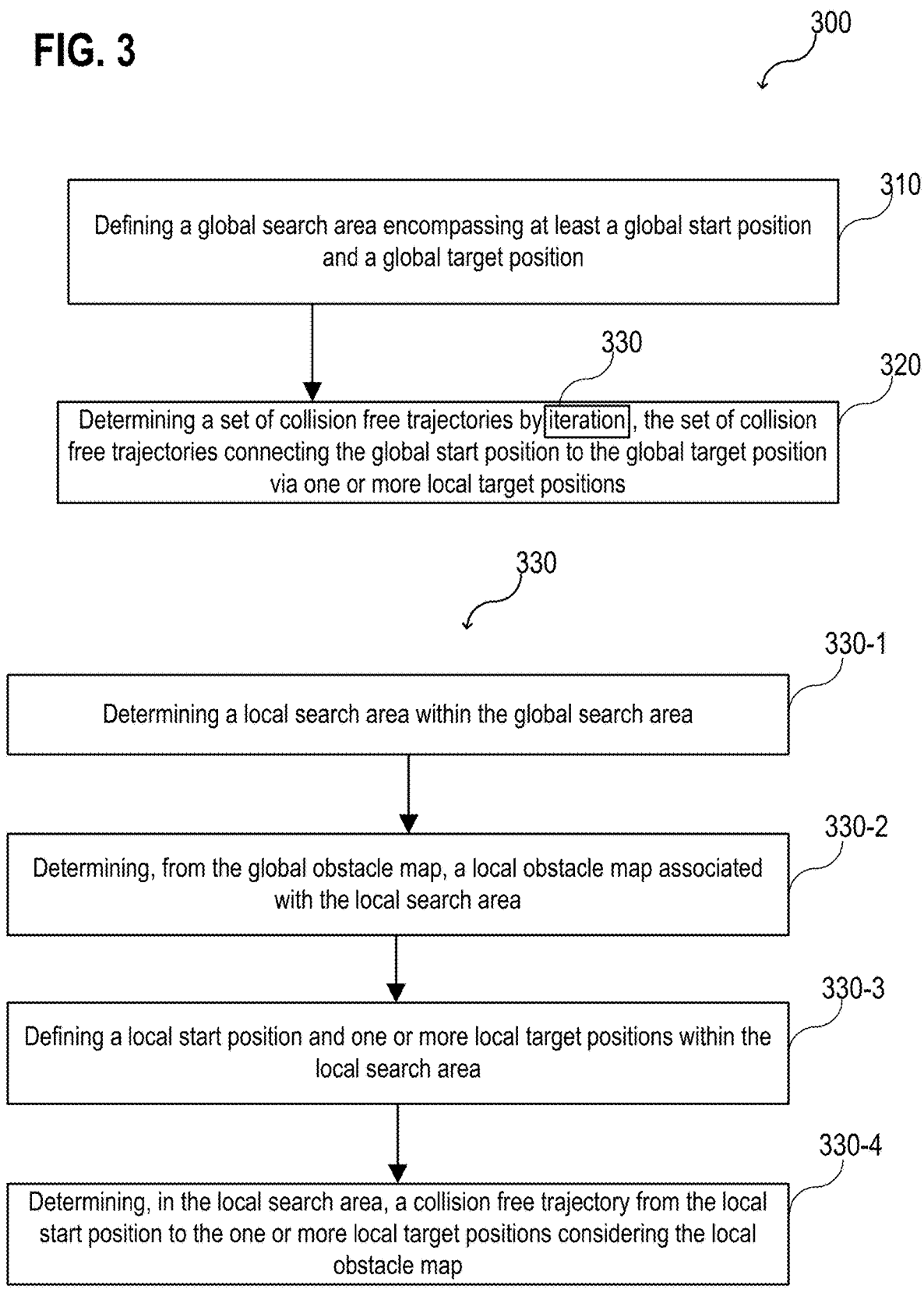
FIG. 3 and FIG. 4 respectively shows a schematic flow diagram of a method for generating a collision free path of travel, according to various aspects.

FIG. 3 shows a schematic flow diagram of a method 300 of generating a collision free path of travel (e.g. the path of travel 206 as illustrated in FIG. 2 for the vehicle 100), according to various aspects. The method 300 may include, for example, in 310, defining a global search area encompassing at least a global start position and a global target position; and, in 320, determining a set of collision free trajectories by iteration 330, the set of collision free trajectories connecting the global start position to the global target position via one or more local target positions. Each iteration 330 may include: in 330-1, determining a local search area within the global search area; in 330-2, determining, from the global obstacle map, a local obstacle map associated with the local search area; in 330-3, defining a local start position and one or more local target positions within the local search area; and, in 330-4, determining (e.g. calculating), in the local search area, a collision free trajectory from the local start position to the one or more local target positions considering the local obstacle map.

Figure 4:
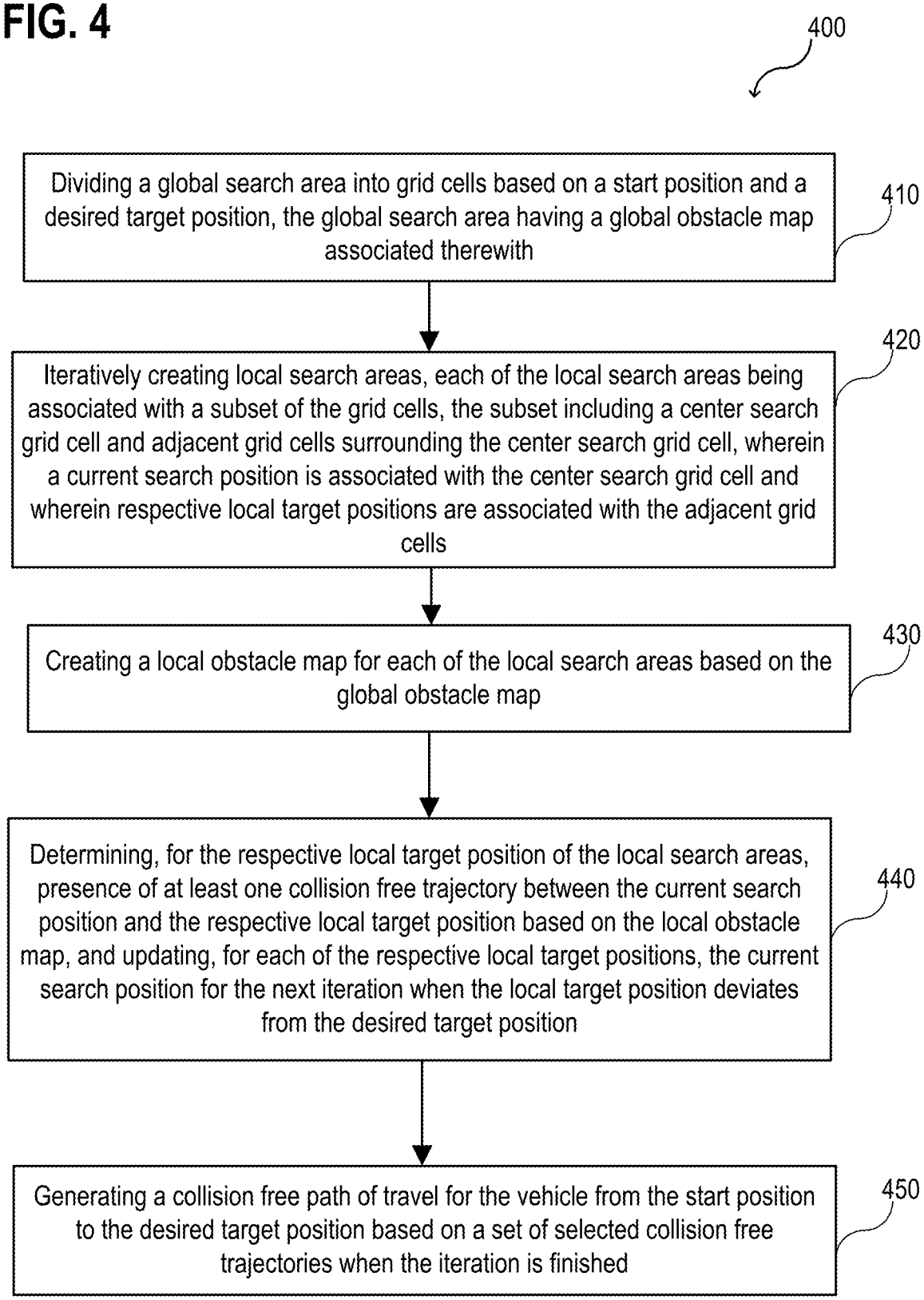

FIG. 4 shows a schematic flow diagram of a method 400 of generating a collision free path of travel (e.g. the path of travel 206 as illustrated in FIG. 2 for the vehicle 100), according to various aspects. A collision free path of travel may avoid collision of any of one or more obstacles in a vicinity of the vehicle with the vehicle. The method 400 may include, for example, in 410, dividing a global search area into grid cells based on a (global) start position and a desired (global) target position, the global search area having a global obstacle map associated therewith, in 420, iteratively creating local search areas, each of the local search areas being associated with a subset of the grid cells, the subset including a center search grid cell and adjacent grid cells surrounding the center search grid cell, wherein a current search position is associated with the center search grid cell and wherein respective local target positions are associated with the adjacent grid cells; in 430, creating a local obstacle map for each of the local search areas based on the global obstacle map; in 440, determining (e.g. via graphical calculation), for the respective local target position of the local search areas, presence of at least one collision free trajectory between the current search position and the respective local target position based on the local obstacle map, and updating, for each of the respective local target positions, the current search position for the next iteration when the local target position deviates from the desired target position; and, in 450, generating a collision free path of travel for the vehicle from the start position to the desired target position based on a set of selected collision free trajectories when the iteration is finished.

In the following, various details are provided related to the configuration of the computing system 200 for generating the collision free path of travel (e.g. the path of travel 206 as illustrated in FIG. 2 for the vehicle 100), according to various aspects. In various aspects, an adaptive directional planner (ADP) is provided. The adaptive directional planner may include an algorithm and (e.g. optionally) a hardware accelerator for real-time, energy-efficient, robust path-planning for mobile robots or any other suitable vehicles.

Figure 5:
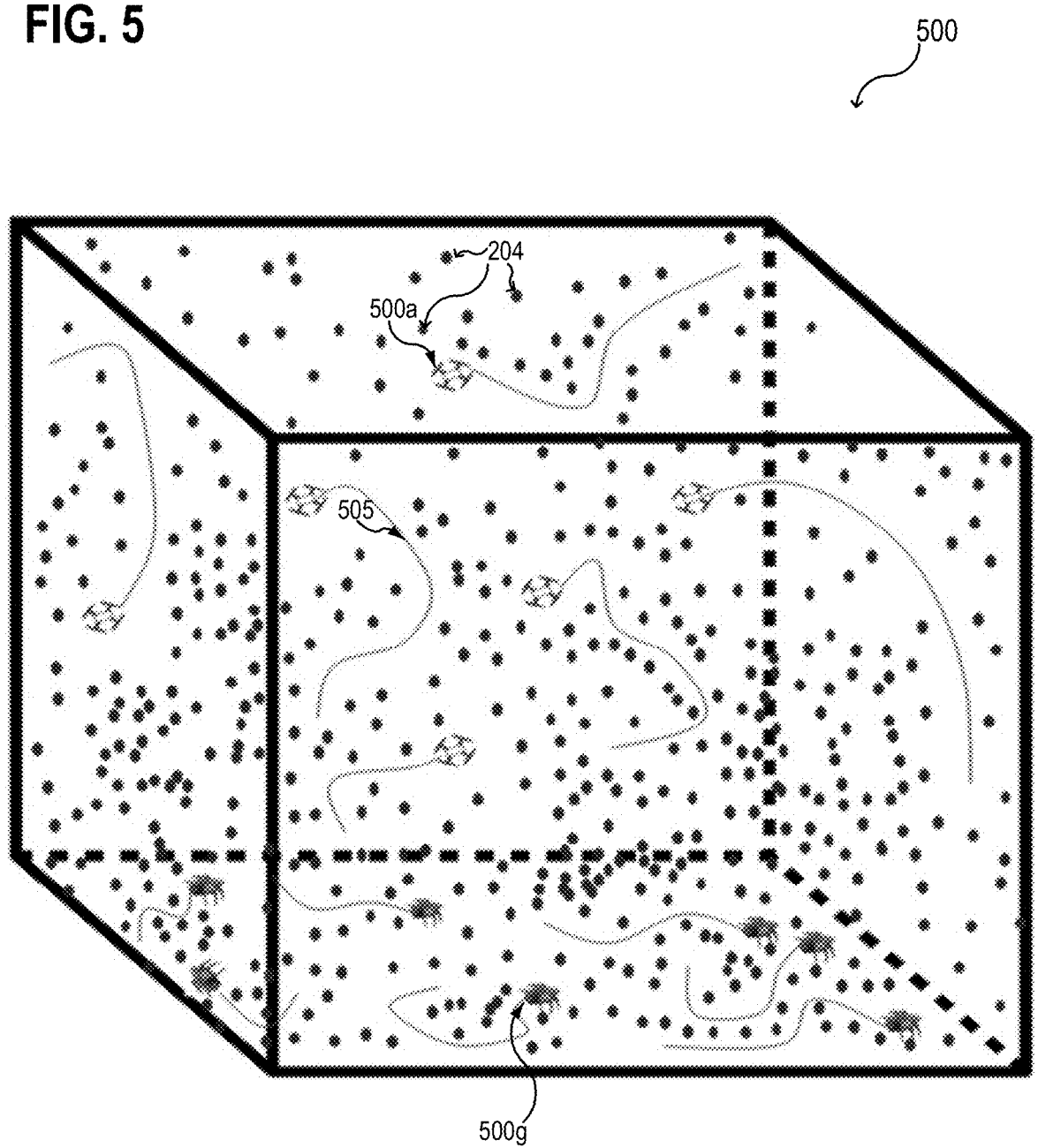
FIG. 5 shows a path planner scenario in a multi agent system, according to some aspects.

FIG. 5 shows exemplarily a path-planning scenario 500 in a multi agent system that has various types of vehicles 100, e.g. ground robots 500g and air robots 500a, according to various aspects. In general, a path/trajectory planning and navigation 505 on that path/trajectory through complex environments may be a task in almost all robotics applications. Whether there is a single bot or multiple robots in a system, path-planning may happen periodically every few milliseconds before a navigation. The basic path-planning problem may be to produce a continuous motion that connects an initial state and a final state with one another, while avoiding collision with obstacles. A robust implementation of the existing solutions that address the path-planning problem may require high performance compute cores with a large memory footprint. It may be challenging to deploy, for example, SoCs for real-time applications with limited memory and critical timing while using commonly known path-planning algorithms that involve a high computational complexity.

As an example, it may be useful to implement a path-planning algorithm (such as described herein) in each robot of a swarm of robots (e.g. small (e.g. insect) form factor robots), which have a comparatively low compute power on board (e.g. one or more sub-gigahertz processors and/or a memory size of less than one megabyte). Usually, a path-planning function for small robots may be outsourced to a cloud/server, which may lead to a communication overhead, latency, and, for example, a reduced energy efficiency. According to various aspects, an algorithm and corresponding architecture for a hardware accelerator are described configured to achieve real-time, robust, energy-efficient local path-planning for mobile robots. In some aspects, the algorithm may be carried out via a dedicated hardware accelerator or via any suitable computing device. An exemplary scenario of path-planning by multiple agents in the system from their current position to their target position, given the obstacle points/map 204 is depicted in FIG. 5.

In general, the path-planning problem has received a considerable amount of attention, especially over the last few decades, as robots started becoming a vital part of modern industry as well as our daily life. The path-planning problem is generally known to be very challenging from the computational point of view. Among the popular methods available for path-planning of mobile robots are either sampling-based methods or graph-based search algorithms. The most widely used path finding algorithms may be rapidly exploring random tree (RRT) and its variants, which are sampling-based planning algorithms. RRT and its variants have been successfully demonstrated on different robotic platforms in major robotics events. In the context of sampling-based path-planning algorithms, the focus may be on finding a feasible path quickly and the optimality of the path is not guaranteed. In order to account for optimality, lot of variants have been proposed but it is often the case that a feasible path is found quickly and additional computation time is devoted to iteratively improve the solution with heuristics. An alternative path-planning approach that may also offer optimality is based on graph search algorithms, such as A*/D*, applied over finite discretization (e.g., on a grid, or a cell decomposition of the configuration space) that is predetermined. A* is an informed search algorithm, that solves by searching amongst all possible paths for the one that incurs the smallest cost. However, optimality of these algorithms may be limited by the grid resolution. Moreover, the memory requirement and execution time grows exponentially with the dimensionality of the state space. However, sampling-based path-planning methods may not guarantee optimality of the path. They usually involve many iterations to converge to an optimal path and are hence compute-intensive. Moreover, the demand for memory storage and compute power is high as the sampling-based algorithms work on continuous space to find an optimal path. Moreover, graph-based approaches that may ensure optimality are usually memory-intensive. As these methods work on grid space, the optimality of a path may be highly dependent on the grid resolution. The higher the grid resolution (i.e. the smaller the dimensions of the grid cells) the higher the probability of an optimal path; and, as a consequence, the higher the memory storage requirement as well. Further, a grid will be marked as unreachable though it has enough free space for the bot to move if there exists at least one obstacle and hence finding an optimal path is not guaranteed with lower grid resolution (higher dimensions for the grids).

According to various aspects, an adaptive directional planner (ADP) algorithm is provided to achieve energy-efficient, memory-optimized, robust local path-planning as opposed to current sampling based or graph-based approaches. It converges quickly to an optimal solution by avoiding iterative refining of solution used in sampling-based planning methods. The algorithm uses heuristics (e.g. a cost function) to move towards the (e.g. shortest) path and, additionally, ensures significantly lower memory usage compared to the graph-based planning.

Using the ADP algorithm described herein, an optimal path may be efficiently approximated using both a graph-based approach and a sampling based approach. According to various aspects, low-resolution grids may be used to address the memory storage and compute requirements. In contrast to a purely graph-based approach that marks a grid with at least one obstacle as unreachable/occupied grid, the ADP algorithm described herein uses a sampling-based approach on top of the graph-based approach to work in continuous space to find an optimal path. Further, heuristics may be incorporated to avoid an iterative refining of a path in continuous space.

The ADP algorithm described herein may enable a real-time local/on-chip path-planning for any mobile robot, especially for small form factor bots that may have a sub megahertz core/micro controller and only a less than a megabyte (e.g. 10 to 100 kilobytes) of data memory. The ADP algorithm may use a heuristics based approach to converge quickly to an optimal path. This leads to performance improvement as well by eliminating iterative refining of the path. Spatial locality may be factored throughout leading to an improved performance with optimized memory accesses and overall memory footprint reduction. To operate in energy efficient way, based on the application/density of the obstacle map, the grid cell sampling density may be freely configured (e.g. by a user) to use different search modes.

The ADP algorithm described herein may be configurable (according to one or more parameters as, for example, the vehicle size, the vehicle shape, a sensor footprint, etc.) to cater to wide variety of vehicles (e.g. mobile robots such as ground bots, UAVs, etc.).

Further, in some aspects (e.g. where the battery life and/or performance may be critical), a fixed function hardware accelerator may be implemented into a computing system, e.g. into a system on a chip (SoC), the fixed function hardware accelerator may enable compelling mobile robotic applications in low cost and small form factor devices.

According to various aspects, the ADP algorithm may be implemented as an advanced high-performance bus (AHB) (or APB, AXI or any interconnect) slave protocol compliant accelerator for non-holonomic, multi-shape mobile robots in a scenario that aims to provide a hardware solution with high performance but low memory footprint for path-planning. Implementation and extensive validation (behavioral, register transfer level (RTL) design and field programmable gate array (FPGA)) have been carried for over 1000 test cases. Using the ADP algorithm described herein an about 30 milliseconds execution time (e.g. for path lengths of 40 meters with around 250 obstacle points) has been achieved at computing system with a clock frequency of 100 MHz and with less than 30 KB (e.g. 15 KB) on die memory.

According to various aspects, the ADP algorithm may combine both a sampling based approach (works in continuous space) and a graph-based approach (works in discrete space) to reduce the overall memory storage and improve performance. The random sampling and iterative method of convergence in sampling based approaches like RRT/iRRT are eliminated by employing informed search technique from graph-based methods like A*/D*. The optimality issue in A*/D* limited to grid resolution may be avoided by using continuous space technique from RRT/iRRT that discards grid space while finding a path avoiding the obstacles. The steps involved in the ADP algorithm are described below in more detail:

Input: START POSITION; TARGET POSITION; OBSTACLE MAP
Output: PATH FOUND; PATH
STEP1: Create a search area to find a path connecting global start position to global target position avoiding obstacles. Assign a current search position to the global start position.
STEP2: Crop an area around the current search position. Create a local obstacle map that has only obstacles in the cropped area.
STEP3: Identify the local target positions within the cropped area that will subsequently lead to the global target position.
STEP4: Find a trajectory that best connects current search position to local target position and update the grid memory.
STEP5: If (local target position == global target position and trajectory exits):
    PATH FOUND = true.
    PATH = all trajectories that connect global start position to global target position.
Else:
    PATH FOUND = false;
STEP6: Using a cost function and pick next low cost search grid cell.
If (low cost search grid cell is valid):
    Current search position = previous local target position in the low cost search grid cell.
    Go to step 2.
Else:
    PATH FOUND = false.
    Couldn't find a path as the search space is exhausted A grid cell (or, in other words, a search grid cell) may be generated by dividing the global search area into a plurality of search grid cells. A grid cell (or, in other words, a search grid cell) of the plurality of search grid cells may be generated by dividing the global search area in accordance with one or more parameters (e.g. grid resolution defining a size of the search grid cells and or type of grid, e.g. defining the shape of the search grid cells). According to various aspects, the size and/or the shape of the search grid cells may be adapted, e.g. in accordance with an obstacle density. As an example, a portion of the global search area having a higher obstacle density may be divided into smaller grid cells than another portion of the global search area having a lower obstacle density. According to various aspects, the search grid cells may have, in two-dimensions, the shape of a square or a rectangle; and, in three dimensions, the shape of a cube or rectangular prism. However, other suitable shapes may be used as well, if desired. According to various embodiments, a low cost search grid cell may be selected as center search grid cell. The low cost search grid cell may be determined based on comparing cost values associated with all of the explored search grid cells.

The global search area may be defined as a bounding box. According to various aspects, a low cost search grid cell may be determined via one or more cost functions, as described in more detail below. Therefore, each explored search grid cell may have a cost value associated therewith.

Figure 6:
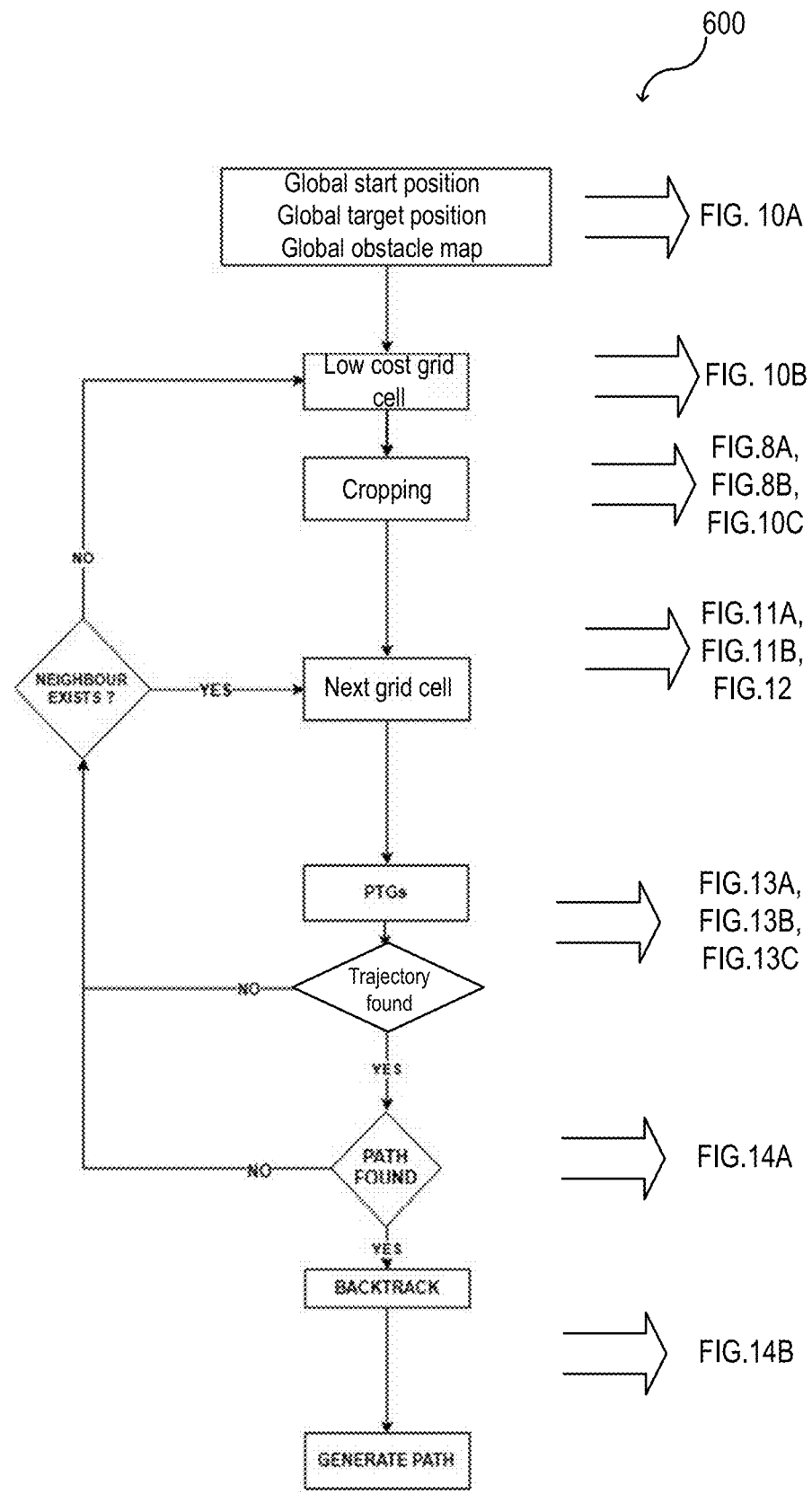
FIG. 6 shows a flow chart of an adaptive path-planning algorithm, according to some aspects.

FIG. 6 shows a flow chart 600 of an exemplary ADP algorithm, according to various aspects. Various aspects are described in more detail below with respect to FIGS. 8A to 14B.

According to various aspects, the ADP algorithm may be implemented any suitable programming language, e.g. in C++, and was validated across thousands of test cases with wide range of configurable options to customize the ADP algorithm based on the applications like surveillance, search and rescue, etc. The ADP algorithm allows for generic applications, e.g. where one or more sensors may fill the obstacle map; the one or more sensors may include a lidar, a monocular/stereo camera, a birds eye view camera mounted on a roof top, or any other suitable sensor. To enable path-planning on low compute/small form factor mobile bots, the algorithm may be implemented in silicon. The hardware accelerator may include an AHB slave protocol compliant interface as many of the small form factor bots employ SoCs that have a sub megahertz core/micro controller and few kilo bytes of data memory hooked up to AHB bus.

Figure 7:
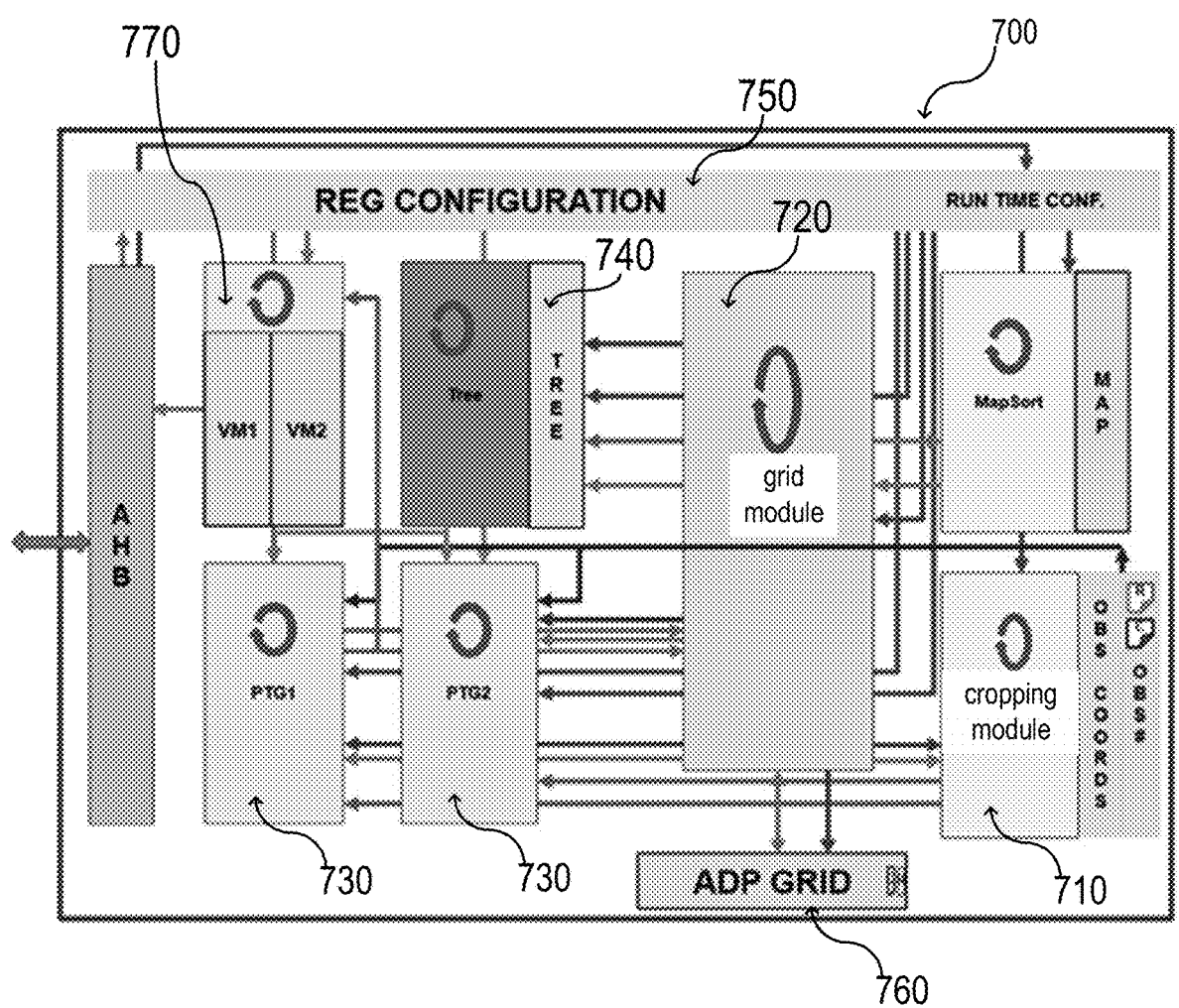
FIG. 7 shows a hardware architecture in a schematic view, according to various aspects.

FIG. 7 shows exemplarily a hardware architecture 700 in a schematic view, according to various aspects. The hardware architecture 700 may be configured to carry out the ADP algorithm, according to various aspects. The hardware architecture 700 may include one or more internal submodules associated with one or more functions of the ADP algorithm, e.g. a cropping module 710 (the cropping module 710 may be configured as a square or cube cropping module to crop a square-shaped or cube-shaped local search area out of a two- or three-dimensional global search area respectively), a grid module 720, one or more trajectory modules 730 (also referred to herein as PTGs), and a path generation module 740 (also referred to herein as TREE or TREE module). The hardware architecture 700 may further include a configuration register 750 including configuration register values. The hardware architecture 700 may further include one or more grid memories 760 (also referred to as ADP grid memory) for storing information associated with a search grid (also referred to as ADP grid). The one or more grid memories 760 may be accessed (updated and read) by the grid module 720 and/or by the path generation module 740. The hardware architecture 700 may further include one or more virtual memories 770, e.g. two virtual memories VM1 and VM2, as illustrated in FIG. 7 as an example. The two virtual memories may include, for example, two ping (VM1) pong (VM2) memories with a storage capacity of, for example, 128 waypoints in the final path. Once the ADP finds the path that has, for example, 192 way points, it starts filling the ping memory with 128 waypoints and then raises an interrupt to the compute core to read the ping memory. While the core reads the ping memory, the ADP fills the pong memory with the remaining 64 waypoints. This may be done to optimize the memory read/write operations. As another example, if the path has, for example, 286 waypoints, the ADP fills the ping memory with 128 waypoints and then raises an interrupt to core. While the core reads ping memory, the ADP fills 128 way points in the pong memory and again raises an interrupt to the core. While the core starts reading the pong memory, the remaining 30 waypoints are written into ping memory.

According to various aspects, the internal submodules may communicate with one another as required by the ADP algorithm and may be configured as described in more detail below. In the following, various aspects are described for a planar grid (e.g. associated with a two-dimensional space) for illustration purposes. It has to be understood that in the same or in a similar way a three-dimensional grid and therefore a three dimensional ADP algorithm may be implemented.

Figure 8A:
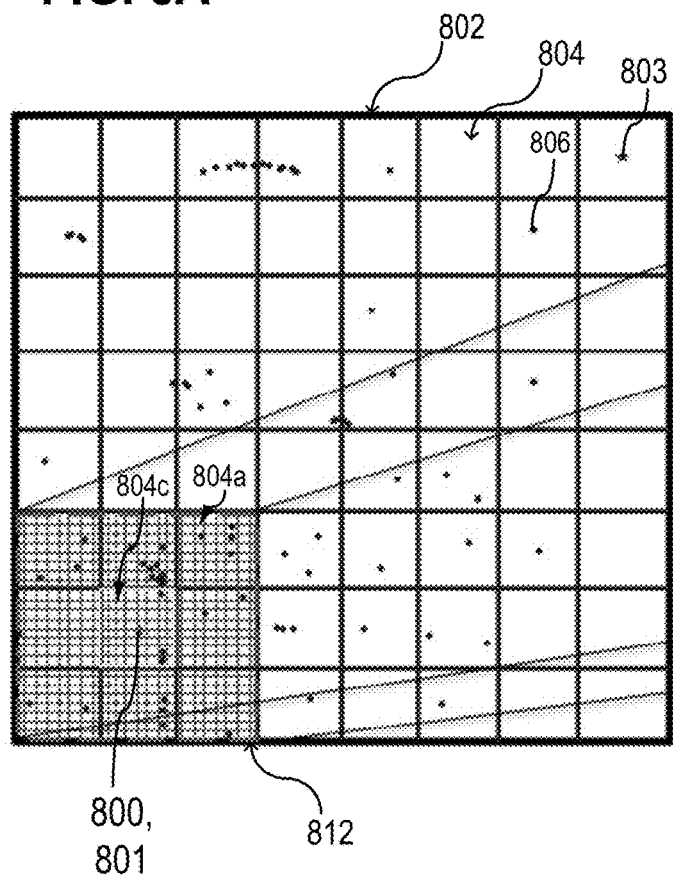
FIG. 8A and FIG. 8B show one or more functions of a cropping module in a schematic view, according to various aspects.
Figure 8B:
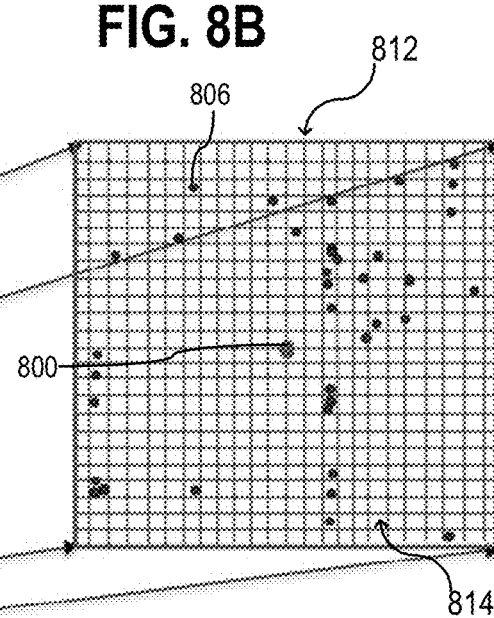
Figure 9:
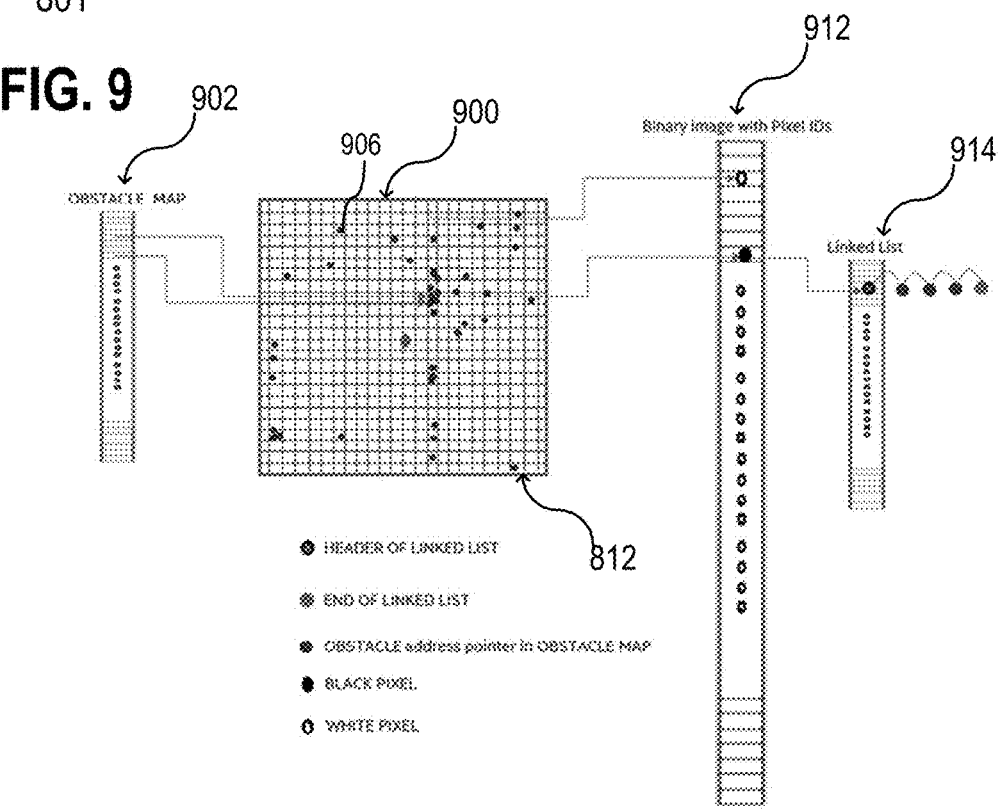
FIG. 9 shows one or more functions of a cropping module in a schematic view, according to various aspects.

With reference to FIG. 8A, FIG. 8B and FIG. 9, the cropping module 710 (and, for example, one or more cropping functions) are described in more detail, according to various aspects. FIG. 8A shows exemplarily a local search area 812, according to various aspects. A global search area 802 may be divided into search grid cells 804 and the local search area 812 may be a cropped search area, e.g. a 3×3 search grid cell area. The cropped search area may be referred to as ADP grid area or local search area 812. A center 800 of the local search area 812 may be associated with a current position of the vehicle 100 that may be a global start position 801, according to various aspects. The global search area 802 may encompass a global target position 803 and one or more obstacles 806. FIG. 8B shows exemplarily an obstacle grid with a plurality of obstacle grid cells 814 (e.g. pixels of a binary image) associated with the local search area 812, according to various aspects. FIG. 9 shows exemplarily a generation of a binary image 900 including obstacles 906 located in the local search area 812. The respective obstacles 906 may be represented in the binary image 900 as pixel colors. A linked list may be used to store the positions of obstacles 906 that are located within the local search area 812. Using a binary image 900 may be only one possible way to identify one or more local target positions; however, any other suitable way may be used as well. FIG. 9 shows exemplarily a transformation of global map to a local obstacle map. The obstacle grid cells may have one or more obstacles that may be stored in a linked list to optimally access the local obstacle map. If the obstacle grid cells as treated as pixels, the centroid of the free space (e.g. the white pixels) can be easily computed using image processing. The obstacle grids cells can be treated as pixels in a binary image so that the black pixels are obstacles and white pixels are free spaces. In case of binary image, a linked list may be used to store the local obstacle points in detail and use a continuous space approach to find a path or strike of those grids as occupied/not reachable and use a grid based approach to find the path.

With a low cost search grid cell 804c as its center, the cropping module 710 may be configured to crop a square with dimensions in such a way that includes the eight adjacent search cells 804a. The search grid cells 804 may be also referred to as ADP grid cells. Initially, the low cost search grid cell 804c may be defined by the global start position 801. During further iterations, the next low cost search grid cell may be determined based on a cost function to provide an optimal local start position for the next iteration. The square may be referred to as local search area 812 (e.g. in this exemplary case a cropped 3×3 ADP grid area). The search grid cells 804 may be generated from the global search area 802 by the grid module 720, as described in more detail below. The global search area 802 may encompass at least the global start position 801 and the global target position 803. All search grid cells 804c, 804a of the local search area 812 may be further divided into finer grid cells referred to as collision grid cells 814 (or, for example, pixels or voxels of an image-based computation) as illustrated in FIG. 8A and FIG. 8B in a schematic view. Since, according to various aspects, the respective current search position (also referred to as local start position) and the respective local target positions are within this (cropped) local search area 812, the obstacle map 902 may be downsized to a local obstacle map 912 to represent the obstacle points 806 that are present in this cropped local search area 812.

According to various aspects, the cropping module 710 (e.g. a square cropping module 710) may be configured to fill the respective pixel intensity values (e.g. 0-black/1-white to take advantage of image processing to find out the centroid of free space) and generate a linked list 914 to store the one or more obstacles as shown in FIG. 9 in a schematic view. The following algorithm may be used for the cropping module 710:

| Input: | GLOBAL OBSTACLE MAP (MAP); LOCAL SEARCH AREA; |
|---|---|
| Output: | LOCAL OBSTACLE MAP. |
| STEP1: | Divide the local search area into obstacle grid cells/pixels based on the configuration register values. Initialize an address pointer. |
| STEP2: | If MAP(address pointer) empty, go to step 7, else read (x, y) coordinates of obstacles from MAP |
| STEP3: | If the local search area contains (x, y), go to step 4, else go to step 2. |
| STEP4: | In the local search area, get the pixel ID based on (x, y) coordinates of the obstacles. |
| STEP5: | If there is no obstacle associated with the pixel ID, associate (x, y) by just storing the address/entry index of (x, y) in the local MAP at pixel ID's linked list, else traverse through the linked list and insert the (x, y) address/entry index in the local MAP at the end of the list. |
| STEP6: | Increment the memory address/entry index pointer of the MAP and go to step 2. |
| STEP7: | Generate square cropping done signal to other modules. |

FIG. 10A shows exemplarily the global search area 802 that is divided into search grid cells 804, according to various aspects. In some aspects, the grid module 720 may be configured to divide the complete (global) search area 802 (including the global start position 801, the global target position 803, and the points representing the obstacles 806) into search grid cells 804 (e.g. ADP grid cells) based on the configuration register values. The configuration register values may represent characteristics of the vehicle 100, for example, a vehicle size. Moreover, the configuration register values may represent a grid resolution and accepted tolerance limits to the target position (e.g. representing how close the vehicle must reach to a target position to verify that a target position is reached) as shown in FIG. 10A.

FIG. 10B shows exemplarily a generation of a local search area 812 with a low cost search grid cell 804c at its center, according to various aspects. FIG. 10C shows exemplarily the square cropping as described above and the binary image output 1014 (as an example) from the cropping module 710, according to various aspects. Once the search grid cells 804 are created, the grid module 720 may be configured to select the low cost search grid cell 804c (e.g. determined by a cost function as search grid cell 804 with the lowest costs in term of travel duration, travel distance, etc.), sample eight adjacent search grid cells 804a around the low cost search grid cell 804c as shown exemplarily in FIG. 10B to provide them as local targets to the one or more trajectory modules 730, evaluate the output trajectories from the one or more trajectory modules 730 to find at least one feasible (e.g. shortest) trajectory from the current search position to a local target position, update the corresponding ADP grid entries and check for path found condition. The following algorithm may be used for grid module 720:

| STEP1: | If there are one or more unexplored search grid cells, pick the low cost search grid cell using cost function and PATH FOUND = false, else go to step 10. Initially, all the search grid cells are unexplored and the low cost search grid cell is the global start position. |
|---|---|
| STEP2: | From the cropping module, get a binary image (e.g. 0 represents a free space; 1 represents one or more obstacles) that encompasses the search grid cells of the local search area. |

| | |
|---|---|
| STEP3: | If the adjacent search grid cell contains the global target position, assign the centroid to the global target position; else compute the centroid of an adjacent search grid cell considering the obstacle free space. |
| STEP4: | If the centroid is connected to the low cost search grid cell through free space (e.g. considering subset of search grid cell areas in the binary image), go to step 5, else go to step 9. |
| STEP5: | Pass the centroid as a local target to one of the one or more trajectory modules. |
| STEP6: | If there exists at least one trajectory, pick one feasible trajectory from the set of trajectories generated by the one or more trajectory modules, else go to step 9. |
| STEP7: | Update the corresponding entries in the grid memory with the trajectory information like parent ID (i.e., the ID of the low cost search grid cell), length of the current trajectory, trajectory module parameters, and cost value. |
| STEP8: | If the adjacent search grid cell has the global target position, PATH FOUND = true and go to step 10. |
| STEP9: | if (adjacent search grid cell counter < 8):<br>    go to step 3;<br>else:<br>    go to step 1; |
| STEP10: | If(PATH FOUND):<br>    generate the path;<br>else:<br>    PATH NOT FOUND; |

According to various aspects, the cost value for each of the explored search grid cells may be generated from one or more cost functions. As an example, a cost value may be calculated as follows: Cost value=Cumulative length of the trajectories connecting the global start position to the local target position (e.g. to the ADP grid cell centroid)+Euclidean distance from the local target position to the global target position.

According to various aspects, the local search area 812 may be, in two-dimensions, a 3×3 search grid cell area with the low cost search grid cell as its center. Accordingly, the local search area may be, in three-dimensions, a 3×3×3 search grid cell area with the low cost search grid cell as its center.

According to various aspects, the subset of search grid cells that are used in step 4 may be, in two-dimensions, a 2×2 search grid cell area. Accordingly, the subset of search grid cells that are used in step 4 may be, in three-dimensions, a 2×2×2 search grid cell area.

FIG. 11A shows exemplarily a local search area 812 (e.g. in this case a 3×3 search grid cell area) with the low cost search grid cell 804c at a center of eight adjacent search grid cells 804a. As illustrated exemplarily in FIG. 11B, a 2×2 search grid cell area 1112 may be used to compute connected components, for example, to check, based on the binary image output 1014 from the cropping module 710, if a centroid 1104 (that may be provided to the one or more trajectory modules 730) of the respective adjacent search grid cell 804a is connected to the low cost search grid cell 804c through free space. The current search position 1101 may be disposed in the low cost search grid cell 804c. However, any other suitable method may be used to determine a free path between two positions in space.

Figure 12:
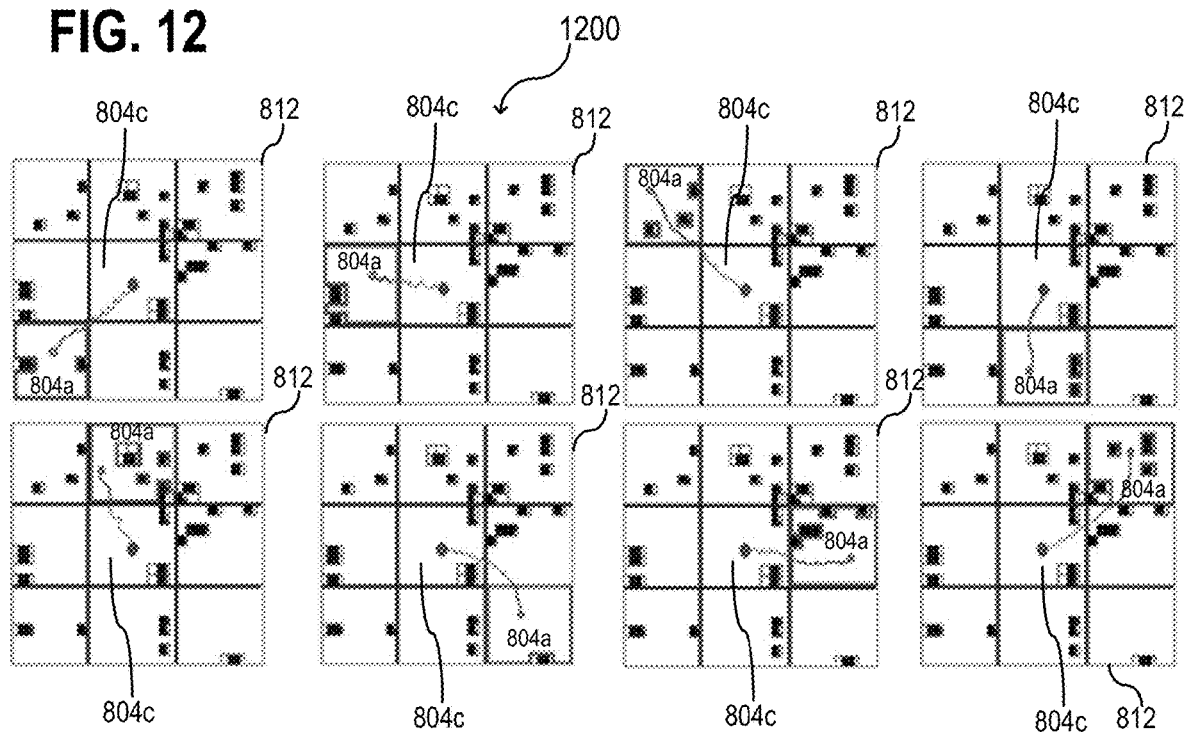
FIG. 12 shows an exemplary centroid calculation for a search grid cell, according to various aspects.

FIG. 12 shows exemplarily a centroid calculation 1200 for each of the eight adjacent search grid cells 804a surrounding the low cost search grid cell 804c disposed in their center. According to various aspects, the local target positions (defined by the adjacent search grid cells 804a) next to the local search position (defined by the low cost search grid cell 804c) may be determined via calculating the centroid 1104 of the free space from the binary image. A centroid may be understood as substantially the arithmetic mean position of all the points in the image, wherein, for example, only the free points (without obstacles) are considered. However, the local target positions may be determined by any other suitable calculation or estimation. In a three-dimensional calculation, the low cost (center) search grid cell 804c of the local search area 812 may have 26 adjacent search grid cells 804a (e.g. forming a cube or rectangular prism) for which the centroids 1104 are to be determined. According to various aspects, the centroids 1104 of the adjacent search grid cells 804a may be used as local targets for determining one or more trajectories connecting the current search position 1101 of the low cost search grid cell 804c to each of the determined centroids 1104 as local targets. According to various aspects, the number of trajectory modules 730 may be adapted to the number of adjacent search grid cells 804a in the local search area 812. As an example, a number x of trajectory modules 730 may be used to calculate efficiently trajectories for a number y of local target positions in the case that y is a multiple of x.

Figure 13A:
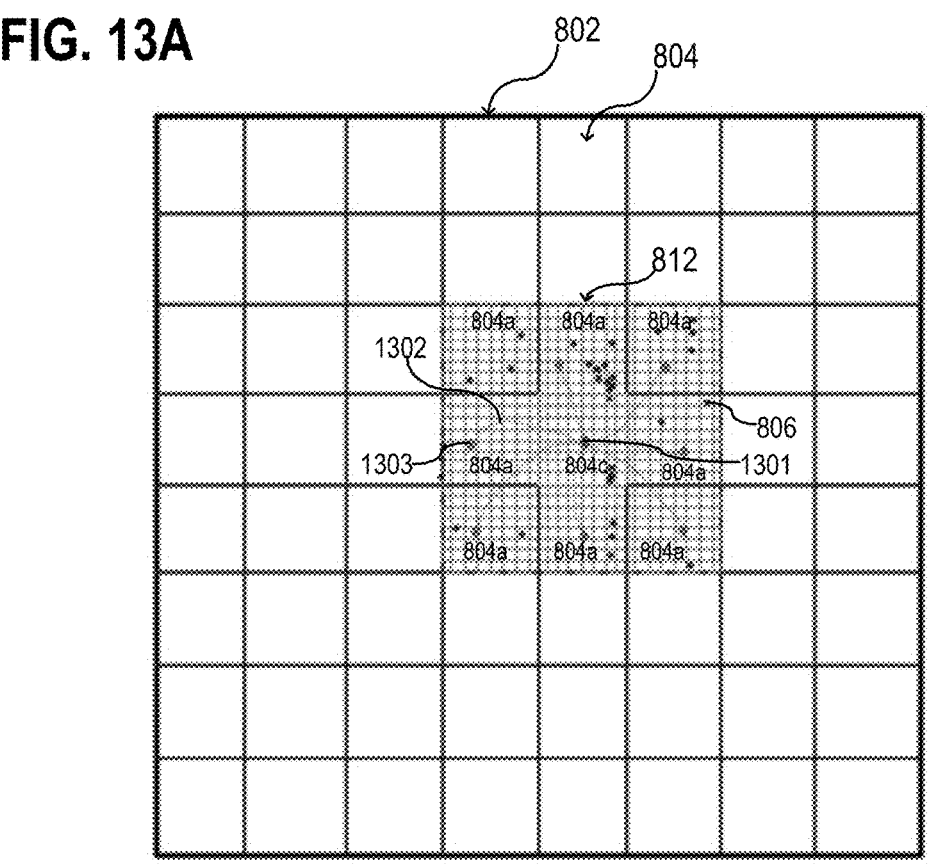
FIG. 13A, FIG. 13B, and FIG. 13C show one or more functions of a trajectory module, according to various aspects.
Figure 13B:
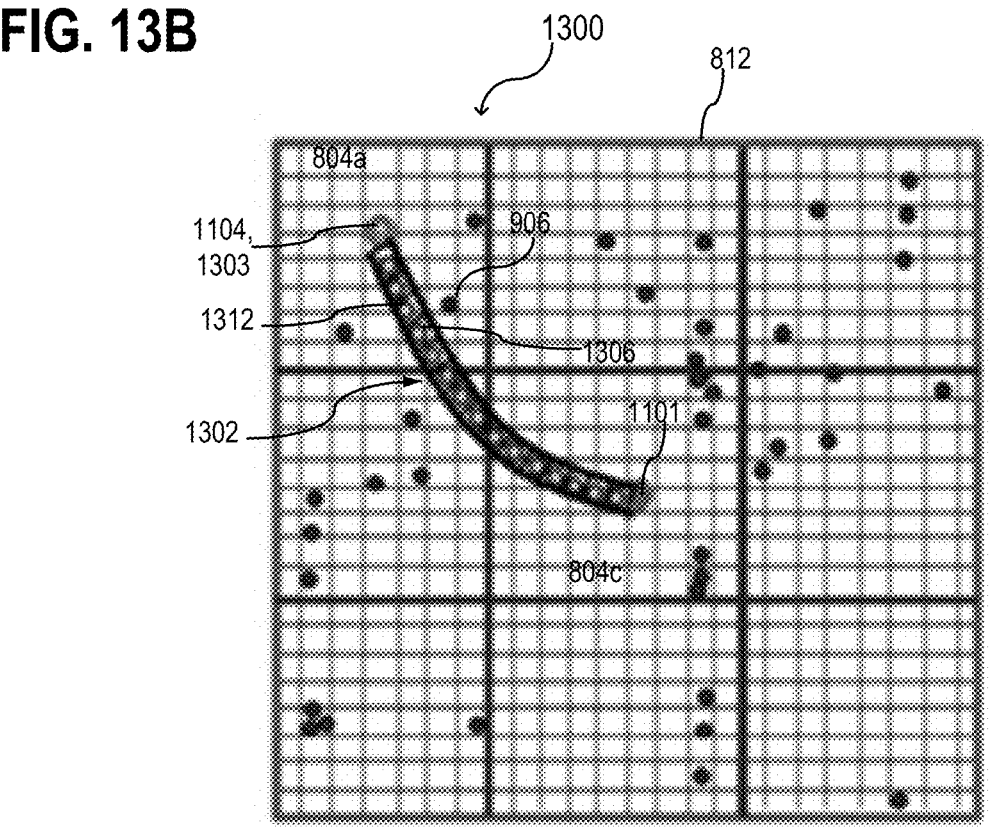
Figure 13C:
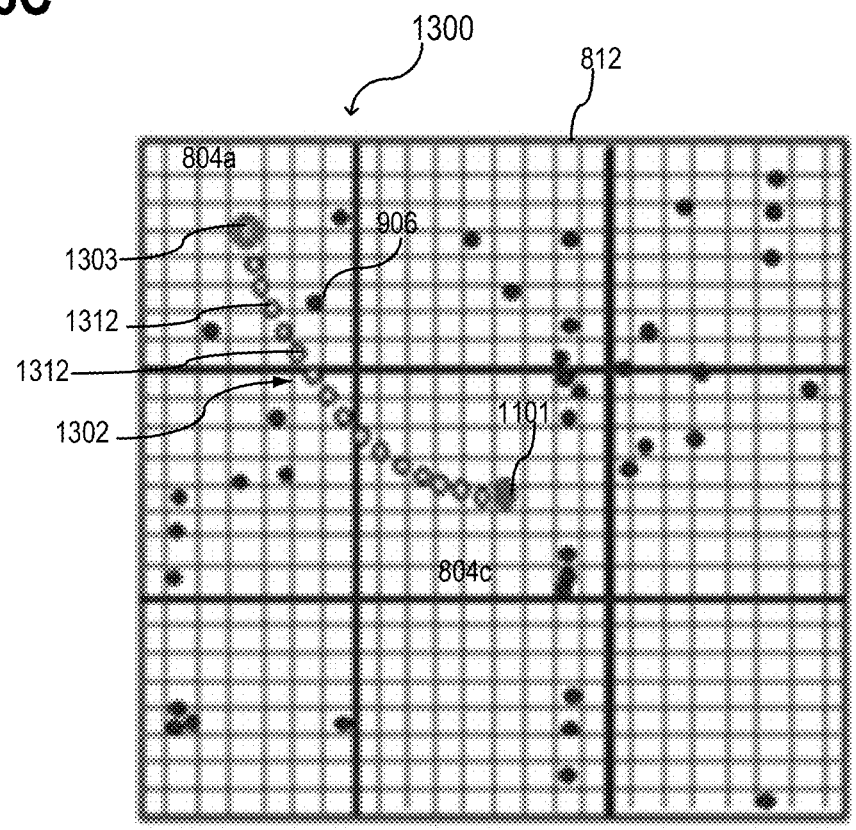

FIG. 13A shows exemplarily trajectories 1302 within the local search area 812 (e.g. in this case within a 3×3 ADP grid area). Each of the trajectories 1302 may be determined to extend from the low cost search grid cell 804c (e.g. from the current search position 1101 that may be either the global start position or a previous local target position) to a local target position 1303 (e.g. a centroid 1104) of one of the adjacent search grid cells 804a, according to various aspects. The trajectories 1302 may be generated via the one or more trajectory modules 730. In some aspects, at least two trajectories 1302 may be generated via parallel computing via at least two trajectory modules 730. FIG. 13B shows exemplarily a collision check 1300 for one of the trajectories 1302 with all relevant obstacles 906 in the local search area 812. The vehicle's centroid 1306 may be positioned at each path point 1312 on the trajectory 1302 to check for a possible collision. FIG. 13C shows exemplarily the path points 1312 distributed along a corresponding collision free trajectory 1302, the path points 1312 connecting the current search position 1101 and the local target position 1303 with one another.

According to various aspects, the one or more trajectory modules 730 (also referred to as PTGs) may be used, for each of the iterations, to determine one or more collision free trajectories if present from the current search position 1101 to the respective local target position 1303.

Based on the kinematics of the vehicle, a wide variety of path models/PTGs can be used. An example may use two PTGs 730, which implement two parameterized trajectories namely circular and asymptotic. These two modules may be configured to find a trajectory that connects the current search position 1101 to a local target position 1303. The path point computation may start from the current search position 1101 in the low cost search grid cell 804c in steps/intervals of delta distance and/or delta time. A path point 1312 may be a data structure that contains x position, y position, z position, orientation, distance travelled, time taken, linear velocity, and/or angular velocity to reach next path point 1312. For each path point 1312, the vehicle 100 may be assumed with its centroid on it along the orientation to check for any overlap with the obstacles 906 in the local search area 812. The generation of path points 1312 may continue as long as there is no collision or until it reaches the local target position 1303 in the respective adjacent search grid cell 804a or until it reaches the global target position 803. Once any of the PTG finds a path to the global target position 803, a path found signal may be generated that goes, for example, as an input to the grid module 720. The grid module 720 may trigger the backtrack function inside the path generation module 740 to trace the trajectories and search grid cells from the global target position to the global start position, which will eventually lead to generation of path points from PTGs to populate the result memory.

An algorithm of at least one trajectory module 730 may be as follows:

| | |
|---|---|
| Input: | CURRENT SEARCH POSITION; LOCAL TARGET POSITION; LOCAL OBSTACLE MAP |
| Output: | TRAJECTORY FOUND; TRAJECTORY INFO; PATH FOUND |
| STEP1: | Get the current search position and the local target position from the grid module; Get the local obstacle map through linked list from the cropping module. |
| STEP2: | Position the centroid of the vehicle at the current search position and check for any overlap of the, for example, polygon shaped vehicle with obstacles. If there is an overlap, it is a collision and go to step 1 to fetch next set of inputs. |
| STEP3: | Compute the next path point that is at delta time or delta distance apart based on the setting of a configuration register. Assign the current search position to next path point. |
| STEP4: | If the current search position is not within acceptable limits to the local target position, go to step 2. |
| STEP5: | If the local target position == global target position, generate a path found signal that triggers the path generation module to construct the final path. |

Figure 14A:
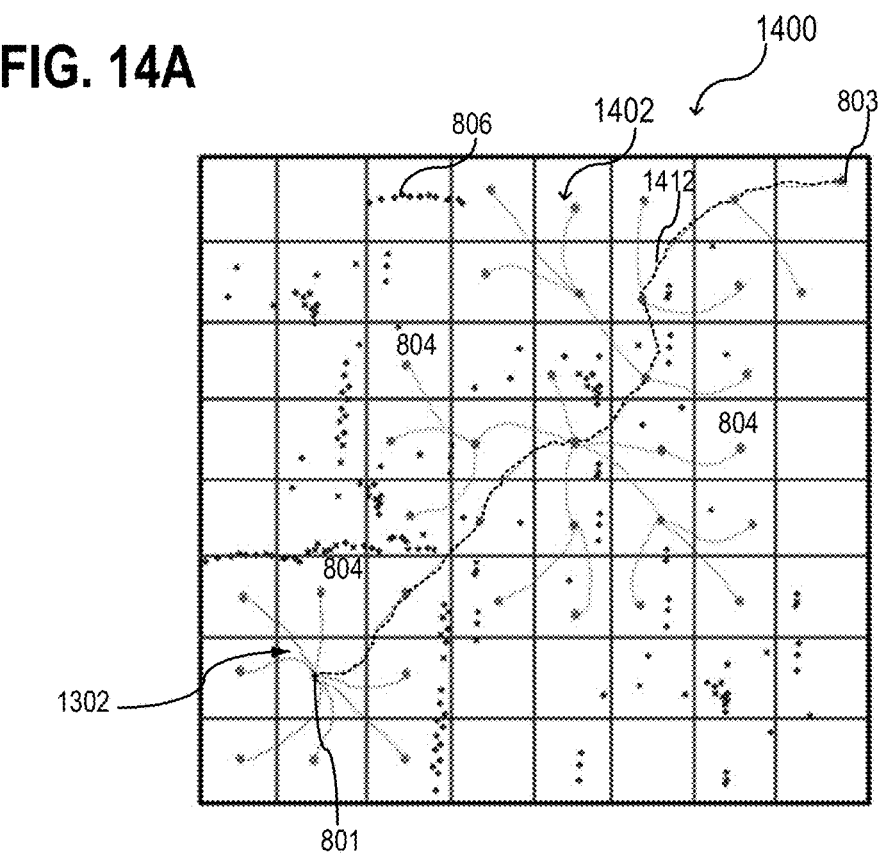
FIG. 14A and FIG. 14B show one or more functions of a path generation module, according to various aspects.
Figure 14B:
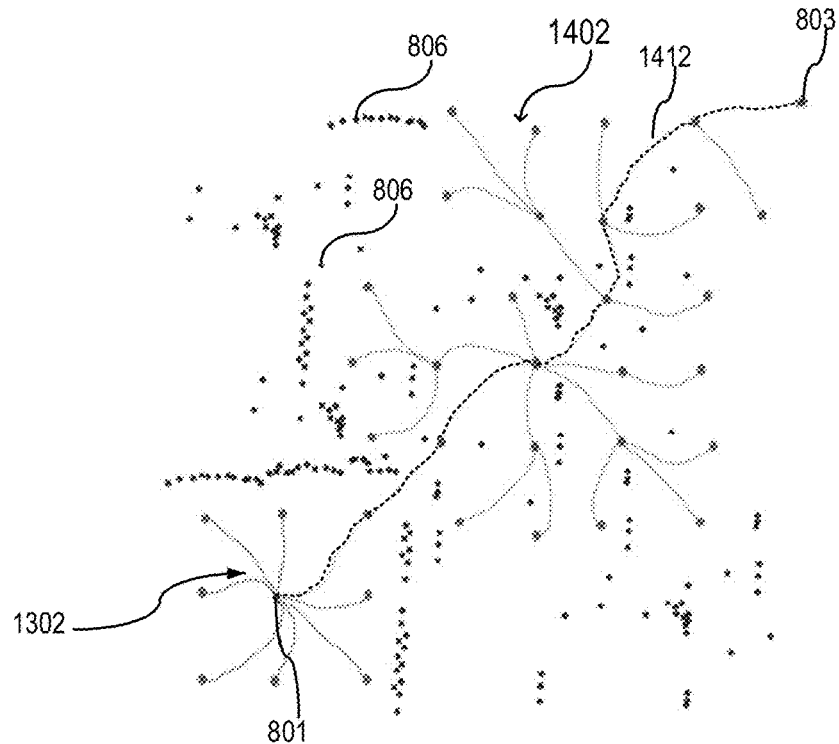

FIG. 14A shows exemplarily information 1400 stored in an ADP Grid memory storage 760, according to various aspects. The ADP Grid memory storage 760 may be updated by the grid module 720 with information representing collision free trajectories 1302 determined by the one or more trajectory modules 730 for various search grid cells 804. FIG. 14B shows exemplarily a generation of a collision free path of travel 1412 from the global start position to the global target position. The collision free path of travel 1412 may be generated by the path generation module 740. For reasons of simplicity, only exemplary trajectories and explored search grid cells are illustrated.

The path generation module 740 may update the grid memory 760 associated with the ADP grid with the information that is required to reconstruct or, in other words, backtrack the path of travel once the path found signal is generated. Each search grid cell 804 may have an entry in the memory that stores information like the parent grid id, length of the trajectory, cost associated with the trajectory, type of PTG and corresponding parameters required to re-generate the trajectory, etc. As shown exemplarily in FIG. 14A, a tree 1402 is constructed based on the trajectory information of each search grid cell. After the generation of the path found signal from the one or more trajectory modules 730, a backtrack function may be implemented to reconstruct the actually collision free path of travel 1412 starting from the global target position 803 to the global start position 801 as exemplarily shown in FIG. 14B.

An algorithm of the path generation module 740 may be as follows:

| | |
|---|---|
| Input: | TRAJECTORY INFORMATION; PATH FOUND SIGNAL |
| Output: | PATH FROM GLOBAL START POSITION TO GLOBAL TARGET POSITION |
| STEP1: | If PATH FOUND == true, Child ID = global target position grid ID and go to step 3. |
| STEP2: | Update trajectory information at the corresponding grid memory location. Go to step 1. |
| STEP3: | Read the Child ID location from the grid memory. Identify the Parent ID i.e., ADP grid ID that led to Child ID. |
| STEP4: | If Parent ID == global start position Grid ID, successfully found the path from global start position to global target position. (termination of the algorithm) |
| STEP5: | Child ID = Parent ID and go to step 3. |

In the following, various examples are provided that are related to the aspects described above.

Example 1 is a computing system, including: one or more processors configured to generate a collision free path of travel for a vehicle from a global start position to a global target position based on input data representing the global start position, the global target position, and a global obstacle map, wherein the generation of the collision free path of travel includes defining a global search area encompassing at least the global start position and the global target position and determining a set of collision free trajectories by iteration, the set of collision free trajectories connecting the global start position to the global target position via one or more local target positions, each iteration including: determining a local search area within the global search area; determining, from the global obstacle map, a local obstacle map associated with the local search area; defining a local start position and one or more local target positions within the local search area; and calculating, in the local search area, a collision free trajectory from the local start position to the respective one or more local target positions considering the local obstacle map.

In Example 2, the computing system of example 1 may further include that the calculation of the respective collision free trajectory is based on at least one parameter that represent an ability and/or a limitation of movement of the vehicle.

In Example 3, the computing system of example 1 may further include that the local start position and the one or more local target positions are determined based on a search grid (around the local start position) and that a route of the respective collision free trajectory is not limited to static grid nodes of the search grid. In some aspects, the route of the respective collision free trajectory is not limited to exact center positions of the search grid.

In Example 4, the computing system of example 1 may further include that the calculation of the respective collision free trajectory is sampling-based. As an example, the calculation of the respective collision free trajectory may be done in continuous space to find (also narrow) feasible paths.

In Example 5, the computing system of example 1 may further include: one or more memories, wherein the one or more processors are configured to store the local obstacle map in the one or more memories, the local obstacle map including a plurality of obstacle grid cells and one or more obstacles associated with the plurality of obstacle grid cells.

In Example 6, the computing system of example 5 may further include that the one or more obstacles are represented by one or more entries in a linked list associated with a respective obstacle grid cell of the plurality of obstacle grid cells.

In Example 7, the computing system of example 5 or 6 may further include that the one or more processors are configured to generate the local obstacle map by mapping the one or more obstacles from the global obstacle map based on their positions to the respective obstacle grid cells of the local obstacle map.

In Example 8, the computing system of any one of examples 5 to 7 may further include that the one or more processors are configured to maintain the generated local obstacle map in the one or memories until the respective iteration is finished.

In Example 9, the computing system of any one of examples 1 to 8 may further include that the one or more processors includes a cropping module configured to carry out the determination of the local obstacle map based on the global obstacle map for each of the respective local search areas.

In Example 10, the computing system of example 9 may further include that the cropping module is configured to generate a cropping done signal when the determination of the local obstacle map is finished.

In Example 11, the computing system of any one of examples 1 to 10 may further include that the one or more processors are configured to divide the global search area into search grid cells.

In Example 12, the computing system of any one of examples 1 to 10 may further include that the collision free trajectory deviates from a route of gridlines of the search grid cells.

In Example 13, the computing system of example 11 may further include that the determination of the local search area includes selecting a subset of the search grid cells of the global search area, the subset including a center search grid cell and adjacent search grid cells surrounding the center search grid cell.

In Example 14, the computing system of example 13 may further include that for each iteration, the center search grid cell is selected from the search grid cells of the global search area based on a cost function.

In Example 15, the computing system of example 14 may further include that the cost function represents an effective travel distance from the global start position to the center search grid cell and from the center search grid cell to the global target position.

In Example 16, the computing system of any one of examples 13 to 15 may further include that the definition of the one or more local target positions includes determining a centroid (e.g. associated with free space) in each of the adjacent search grid cells.

In Example 17, the computing system of any one of examples 13 to 16 may further include that the definition of the local start position includes selecting the global start position at the beginning of the iteration or selecting a respective local target position of a search grid cell defined in a previous iteration.

In Example 18, the computing system of any one of examples 1 to 17 may further include that the one or more processors include a search grid module configured to carry out iteratively the determination of the local search area and to update search grid cell data stored in one or more memories.

In Example 19, the computing system of example 18 may further include that the search grid cell data including trajectory data obtained from the determination of the collision free trajectory from the local start position to the one or more local target positions and/or cost data representing a cost value associated with search grid cells corresponding to the one or more local target positions.

In Example 20, the computing system of example 18 or 19 may further include that the determination of the collision free trajectory from the local start position to each of the one or more local target positions includes selecting a collision free trajectory from a set of collision free trajectories generated by one or more parameterized trajectory generators, wherein the selection of the respective collision free trajectory is based on one or more predefined parameters.

In Example 21, the computing system of example 20 may further include that the one or more parameterized trajectory generators are configured to receive the local start position and the respective local target position from the search grid module and the local obstacle map from the cropping module, generate path points along a trajectory connecting the local start position to the respective local target position, and check each of the path points for a collision with one or more obstacles based on the local obstacle map.

In Example 22, the computing system of example 20 or 21 may further include that the one or more parameterized trajectory generators are further configured to check whether the local target is within a predefined distance from the global target position and, if this is the case, to output a confirmation signal to the search grid module.

In Example 23, the computing system of any one of examples 18 to 22 may further include that the one or more processors include a path generation module configured to receive the search grid cell data and, when the confirmation signal is output, to generate the collision free path of travel from the global start position to the global target position based on the search grid cell data.

In Example 24, the computing system of example 23 may further include that the path generation module is configured to generate the collision free path of travel by tracking the respective collision free trajectories of the set of collision free trajectories back from the global target position back to the global start position.

Example 25 is a computing system of a vehicle, the computing system including: a grid module configured to divide a global search area into grid cells based on a start position and a desired target position, the global search area having a global obstacle map associated therewith, iteratively create local search areas, each of the local search areas being associated with a subset of the grid cells, the subset including a center search grid cell and adjacent grid cells surrounding the center search grid cell, wherein a current search position is associated with the center search grid cell and wherein respective local target positions are associated with the adjacent grid cells; a cropping module configured to create a local obstacle map for each of the local search areas based on the global obstacle map; one or more trajectory modules configured to calculate, for the respective local target position of the local search areas, at least one collision free trajectory between the current search position and the respective local target position based on the local obstacle map, wherein the grid module is further configured, for each of the respective local target positions, to update the current search position for the next iteration when the local target position deviates from the desired target position; and a path generation module configured to generate a collision free path of travel for the vehicle from the start position to the desired target position based on a set of selected collision free trajectories when the iteration is finished.

In Example 26, the computing system of example 25 may further include that the grid module is further configured, for each of the respective local target positions, to select a collision free trajectory from a set of collision free trajectories generated by the one or more parameterized trajectory generators, wherein the selection of the respective collision free trajectory is based on one or more predefined parameters.

In Example 27, the computing system of any one of examples 1 to 26 may further include that the vehicle is a robot.

In Example 28, the computing system of any one of examples 1 to 26 may further include that the vehicle an unmanned vehicle.

In Example 29, the computing system of any one of examples 1 to 26 may further include that the vehicle is at least one of an unmanned aerial vehicle, an unmanned ground vehicle, an unmanned underwater vehicle, an unmanned space vehicle, and/or an unmanned vessel.

Example 30 is a method of generating a collision free path of travel, the method including: defining a global search area encompassing at least a global start position and a global target position; and determining a set of collision free trajectories by iteration, the set of collision free trajectories connecting the global start position to the global target position via one or more local target positions, each iteration including: determining a local search area within the global search area; determining, from the global obstacle map, a local obstacle map associated with the local search area; defining a local start position and one or more local target positions within the local search area; and determining, in the local search area, a collision free trajectory from the local start position to the one or more local target positions considering the local obstacle map.

In Example 31, the method of example 30 may further include: storing the local obstacle map in one or more memories, the local obstacle map including a plurality of obstacle grid cells and one or more obstacles associated with the plurality of obstacle grid cells.

In Example 32, the method of example 31 may further include that the one or more obstacles are represented by one or more entries in a linked list associated with a respective obstacle grid cell of the plurality of obstacle grid cells.

In Example 33, the method of example 31 or 32 may further include that the one or more processors are configured to generate the local obstacle map by mapping the one or more obstacles from the global obstacle map based on their positions to the respective obstacle grid cells of the local obstacle map.

In Example 34, the method of any one of examples 31 to 33 may further include: maintaining the generated local obstacle map in the one or memories until the respective iteration is finished.

In Example 35, the method of any one of examples 30 to 34 may further include that the determination of the local obstacle map is carried out based on the global obstacle map for each of the respective local search areas.

In Example 36, the method of example 35 may further include generating via a cropping module, a cropping done signal when the determination of the local obstacle map is finished.

In Example 37, the method of any one of examples 30 to 36 may further include: dividing the global search area into search grid cells.

In Example 38, the method of example 37 may further include that the determination of the local search area includes selecting a subset of the search grid cells of the global search area, the subset including a center search grid cell and adjacent search grid cells surrounding the center search grid cell.

In Example 39, the method of example 38 may further include that for each iteration, the center search grid cell is selected from the search grid cells of the global search area based on a cost function.

In Example 40, the method of example 39 may further include that the cost function represents an effective travel distance from the global start position to the center search grid cell and from the center search grid cell to the global target position.

In Example 41, the method of any one of examples 38 to 40 may further include that the definition of the one or more local target positions includes determining a centroid in each of the adjacent search grid cells.

In Example 42, the method of any one of examples 38 to 41 may further include that the definition of the local start position includes selecting the global start position at the beginning of the iteration or selecting a respective local target position of a search grid cell defined in a previous iteration.

In Example 43, the method of any one of examples 30 to 42 may further include: iteratively carrying out the determination of the local search area via a search grid module and updating search grid cell data stored in one or more memories.

In Example 44, the method of example 43 may further include that the search grid cell data including trajectory data obtained from the determination of the collision free trajectory from the local start position to the one or more local target positions and/or cost data representing a cost value associated with search grid cells corresponding to the one or more local target positions.

In Example 45, the method of example 43 or 44 may further include that the determination of the collision free trajectory from the local start position to each of the one or more local target positions includes selecting a collision free trajectory from a set of collision free trajectories generated by one or more parameterized trajectory generators, wherein the selection of the respective collision free trajectory is based on one or more predefined parameters.

In Example 46, the method of example 45 may further include: receiving the local start position and the respective local target position from the search grid module and the local obstacle map from the cropping module via the one or more parameterized trajectory generators, generating path points along a trajectory connecting the local start position to the respective local target position, and checking each of the path points for a collision with one or more obstacles based on the local obstacle map.

In Example 47, the method of example 45 or 46 may further include: checking, via the one or more parameterized trajectory generators, whether the local target is within a predefined distance from the global target position and, if this is the case, outputting a confirmation signal to the search grid module.

In Example 48, the method of any one of examples 43 to 47 may further include receiving, via a path generation module, the search grid cell data, and, when the confirmation signal is output, generating the collision free path of travel from the global start position to the global target position based on the search grid cell data.

In Example 49, the method of example 48 may further include that generating the collision free path of travel includes tracking the collision free trajectories back from the global target position to the global start position.

Example 50 is a method of generating a collision free path of travel, the method including: dividing a global search area into grid cells based on a start position and a desired target position, the global search area having a global obstacle map associated therewith, iteratively creating local search areas, each of the local search areas being associated with a subset of the grid cells, the subset including a center search grid cell and adjacent grid cells surrounding the center search grid cell, wherein a current search position is associated with the center search grid cell and wherein respective local target positions are associated with the adjacent grid cells; creating a local obstacle map for each of the local search areas based on the global obstacle map; determining, for the respective local target position of the local search areas, presence of at least one collision free trajectory between the current search position and the respective local target position based on the local obstacle map, and updating, for each of the respective local target positions, the current search position for the next iteration when the local target position deviates from the desired target position; and generating a collision free path of travel for the vehicle from the start position to the desired target position based on a set of selected collision free trajectories when the iteration is finished In Example 51, the method of example 50 may further include: selecting, for each of the respective local target positions, a collision free trajectory from a set of collision free trajectories generated by the one or more parameterized trajectory generators, wherein the selection of the respective collision free trajectory is based on one or more predefined parameters.

Example 52 is a computing system including: one or more processors configured to generate a collision free path of travel for a vehicle from a global start position to a global target position based on input data representing the global start position, the global target position, and a global obstacle map, wherein the generation of the collision free path of travel includes generating local targets between the global start position and the global target position via a graph-based search algorithm, and generating a collision free trajectory between each pair of adjacent global target positions via a sampling-based search algorithm, the respectively generated collision free trajectories defining the collision free path of travel.

Example 53 is a computing system comprising means for performing one or more (or all) steps of a method according to any one of examples 30 to 51.

Example 54 are one or more non-transitory computer-readable media storing instructions thereon that, when executed by at least one processor of a computing system, direct the computing system to perform at least one or more (or all) steps of a method according to any one of examples 30 to 51.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A computing system comprising:
a processor configured to generate a collision free path of travel for an autonomous vehicle from a global start position to a global target position based on input data representing the global start position, the global target position, and a global obstacle map,
wherein the generation of the collision free path of travel comprises:
defining a global search area encompassing at least the global start position and the global target position and that includes a plurality of portions;
determining a set of collision free trajectories by iteration, the set of collision free trajectories connecting the global start position to the global target position via a local target position, each iteration comprising:
determining a local search area within the global search area, wherein the local search area includes a plurality of search grid cells comprising a center search grid cell and a plurality of adjacent search grid cells, the center search grid cell being determined based on a cost function; determining, from the global obstacle map, a local obstacle map associated with the local search area;
determining a size of each search grid cell of the plurality of search grid cells based on the obstacle density of each portion associated with the local search area;
defining a local start position and the local target position within the local search area, the local target position corresponding to a centroid of free space in an adjacent search grid cell of the plurality of adjacent search grid cells and the cost function comprises a cumulative travel distance between the global start position and the local target position corresponding to a previous adjacent search grid cell and a Euclidean distance between the local target position corresponding to the previous adjacent search grid cell and the global target position; and
calculating, in the local search area, a collision free trajectory from the local start position to the local target position considering the plurality of search grid cells and the local obstacle map; and
causing the autonomous vehicle to operate according to the determined set of collision free trajectories from the global start position to the global target position.

2. The computing system of claim 1,
wherein the calculation of the respective collision free trajectory is based on a parameter that represents an ability and/or a limitation of movement of the autonomous vehicle.

3. The computing system of claim 1,
wherein the local start position and the local target position is determined based on a search grid and wherein a route of the respective collision free trajectory is not limited to grid nodes of the search grid.

4. The computing system of claim 1,
wherein the calculation of the respective collision free trajectory is sampling-based.

5. The computing system of claim 1, further comprising:
a memory, wherein the processor is configured to store the local obstacle map in the memory, the local obstacle map comprising a plurality of obstacle grid cells and an obstacle associated with the plurality of obstacle grid cells.

6. The computing system of claim 5,
wherein the obstacle is represented by an entry in a linked list associated with a respective obstacle grid cell of the plurality of obstacle grid cells.

7. The computing system of claim 5,
wherein the processor is configured to generate the local obstacle map by mapping the obstacle from the global obstacle map based on its position to the respective obstacle grid cells of the local obstacle map; and
wherein the processor is configured to maintain the generated local obstacle map in the memory until the respective iteration is finished.

8. The computing system of claim 1,
wherein the processor comprises a cropping module configured to carry out the determination of the local obstacle map based on the global obstacle map for each of the local search areas.

9. The computing system of claim 1,
wherein the processor is configured to divide the global search area into a plurality of cells; and
wherein the determination of the local search area comprises selecting a subset of the plurality of cells corresponding to a subset of the global search area.

10. The computing system of claim 9,
wherein the definition of the local target position comprises determining the centroid of free space in each of the adjacent search grid cells; and
wherein the centroid of free space in each of the adjacent search grid cells comprises an arithmetic mean of free space in the corresponding adjacent search grid cell.

11. The computing system of claim 9,
wherein the definition of the local start position comprises selecting the global start position at the beginning of the iteration or selecting a respective local target position of an adjacent search grid cell defined in a previous iteration.

12. The computing system of claim 1,
wherein the input data further comprises search grid cell data corresponding to each search grid cell of the plurality of search grid cells and the processor comprises a search grid module configured to carry out iteratively the determination of the local search area and to update the search grid cell data stored in a memory.

13. The computing system of claim 12,
wherein the search grid cell data comprises trajectory data obtained from the determination of the collision free trajectory from the local start position to the local target position and/or cost data representing a cost value associated with search grid cells corresponding to the local target position.

14. The computing system of claim 12,
wherein the determination of the collision free trajectory from the local start position to the local target position comprises selecting a collision free trajectory from a set of collision free trajectories generated by a parameterized trajectory generator, wherein the selection of the respective collision free trajectory is based on a predefined parameter.

15. The computing system of claim 14,
wherein the parameterized trajectory generator is configured to:
receive the local start position and the local target position from the search grid module and the local obstacle map from the cropping module,
generate path points along a trajectory connecting the local start position to the local target position, and
check each of the path points for a collision with the obstacle based on the local obstacle map.

16. The computing system of claim 12,
wherein the processor comprises a path generation module configured to receive the search grid cell data and, when a confirmation signal is output, to generate the collision free path of travel from the global start position to the global target position based on the search grid cell data.

17. A computing system of an autonomous vehicle, the computing system comprising:
a grid module configured to:
determine an obstacle density of a plurality of portions of a global search area based on a global obstacle map associated therewith;
divide the global search area into grid cells based on a global start position and a desired global target position, wherein a size of each of the grid cells is based on the obstacle density of a corresponding portion,
iteratively create local search areas,
each of the local search areas being associated with a subset of the grid cells, the subset of grid cells including a center grid cell and adjacent grid cells surrounding the center grid cell and each of the adjacent grid cells being associated with an obstacle,
wherein the center grid cell is determined based on a cost function,
wherein a current search position is associated with the center grid cell, and
wherein local target positions are associated with the adjacent grid cells and each local target position corresponds to a centroid of free space of a corresponding adjacent grid cell, and
wherein the cost function comprises a cumulative travel distance between the global start position and the local target position corresponding to a previous adjacent grid cell and a Euclidean distance between the local target position corresponding to the previous adjacent grid cell and the desired global target position;
a cropping module configured to create a local obstacle map for each of the local search areas based on the global obstacle map;
a trajectory module configured to calculate, for each of the local target positions a collision free trajectory between a corresponding current search position and the local target position based on a corresponding local obstacle map,
wherein the grid module is further configured, for each of the local target positions, to update the current search position for the next iteration when the local target position deviates from the desired global target position; and
a path generation module configured to:
generate a collision free path of travel for the autonomous vehicle from the global start position to the desired global target position based on a set of selected collision free trajectories when the iteration is finished; and
cause the autonomous vehicle to operate according to the collision free path of travel from the global start position to the desired global target position.

18. The computing system of claim 17,
wherein the grid module is further configured, for each of the local target positions, to select a collision free trajectory from a set of collision free trajectories generated by the trajectory generator, wherein the selection of the respective collision free trajectory is based on a predefined parameter.

19. The computing system of claim 17,
wherein the autonomous vehicle is at least one of an unmanned aerial vehicle, an unmanned ground vehicle, an unmanned underwater vehicle, an unmanned space vehicle, and/or an unmanned vessel.

20. A method of generating a collision free path of travel for an autonomous vehicle, the method comprising:
defining a global search area encompassing at least a global start position and a global target position and that includes a plurality of portions;
determining a set of collision free trajectories by iteration, the set of collision free trajectories connecting the global start position to the global target position via a local target position, each iteration comprising:
determining a local search area within the global search area, wherein the local search area includes a plurality of search grid cells comprising a center search grid cell and a plurality of adjacent search grid cells, the center search grid cell being determined based on a cost function;

generating, based on a global obstacle map corresponding to the global search area, a local obstacle map associated with the local search area;

determining an obstacle density of each portion associated with the local search area based on the local obstacle map;

determining a grid resolution of the local search area based on the obstacle density of each portion associated with the local search area, the grid resolution defining a size of each search grid cell of the plurality of search grid cells;

defining a local start position and a local target position within the local search area, the local target position corresponding to a centroid of free space in an adjacent search grid cell of the plurality of adjacent search grid cells and the cost function comprises a cumulative travel distance between the global start position and the local target position corresponding to a previous adjacent search grid cell and a Euclidean distance between the local target position corresponding to the previous adjacent search grid cell and the global target position; and calculating, in the local search area, a collision free trajectory for the autonomous vehicle from the local start position to the local target position considering the plurality of search grid cells and the local obstacle map; and causing the autonomous vehicle to operate according to the determined set of collision free trajectories from the global start position to the global target position.

* * * * *